United States Patent
Abotabl et al.

(10) Patent No.: US 12,471,072 B2
(45) Date of Patent: Nov. 11, 2025

(54) TIMER-BASED SWITCHING FOR MULTIPLE ACTIVE BANDWIDTH PARTS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Alexandros Manolakos, Escondido, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 18/000,811

(22) PCT Filed: Jul. 12, 2021

(86) PCT No.: PCT/US2021/041309
§ 371 (c)(1),
(2) Date: Dec. 5, 2022

(87) PCT Pub. No.: WO2022/015660
PCT Pub. Date: Jan. 20, 2022

(65) Prior Publication Data
US 2023/0328703 A1 Oct. 12, 2023

(30) Foreign Application Priority Data
Jul. 17, 2020 (GR) ............................... 20200100422

(51) Int. Cl.
*H04W 72/0453* (2023.01)
*H04W 72/02* (2009.01)

(52) U.S. Cl.
CPC ....... *H04W 72/0453* (2013.01); *H04W 72/02* (2013.01)

(58) Field of Classification Search
CPC .......................... H04W 72/0453; H04W 72/02
See application file for complete search history.

(56) References Cited

U.S. PATENT DOCUMENTS 11,683,755 B2 * 6/2023 Tang ..................... H04W 76/28
370/311
2019/0357300 A1 11/2019 Zhou et al.
(Continued)

FOREIGN PATENT DOCUMENTS

CN 111328143 A 6/2020
WO WO-2019070579 4/2019
(Continued)

OTHER PUBLICATIONS

International Search Report and Written Opinion—PCT/US2021/041309—ISA/EPO—Oct. 28, 2021.

*Primary Examiner* — Ricky Q Ngo
*Assistant Examiner* — Kabir U Jahangir
(74) *Attorney, Agent, or Firm* — Kevin M. Donnelly; Holland & Hart LLP

(57) ABSTRACT

This disclosure provides methods, devices, and systems for full-duplex communications in wireless networks. Some implementations more specifically relate to multiple bandwidth parts (BWPs), active concurrently, for communications in a given direction (such as a downlink (DL) direction or an uplink (UL) direction) between a user equipment (UE) and a base station. For example, a first active BWP may be used for DL or UL communications in a half-duplex (HD) slot and a second active BWP may be used for DL or UL communications in an adjacent full-duplex (FD) slot. In some implementations, the UE may further change a status of one or more active BWPs after a given amount of time has (Continued)

elapsed. For example, the UE may change the states of an active BWP by deactivating the active BWP, switching the active BWP to a default BWP, or changing a role assigned to the active BWP.

31 Claims, 23 Drawing Sheets

(56) References Cited

U.S. PATENT DOCUMENTS

| | | | |
|---|---|---|---|
| 2021/0091914 A1* | 3/2021 | Xue | H04W 72/23 |
| 2021/0281369 A1* | 9/2021 | Awad | H04L 5/0005 |
| 2023/0164753 A1* | 5/2023 | Abotabl | H04L 5/0098 |
| | | | 370/329 |

FOREIGN PATENT DOCUMENTS

| | | |
|---|---|---|
| WO | WO-2019160720 A1 | 8/2019 |
| WO | WO-2020020734 A1 | 1/2020 |

\* cited by examiner

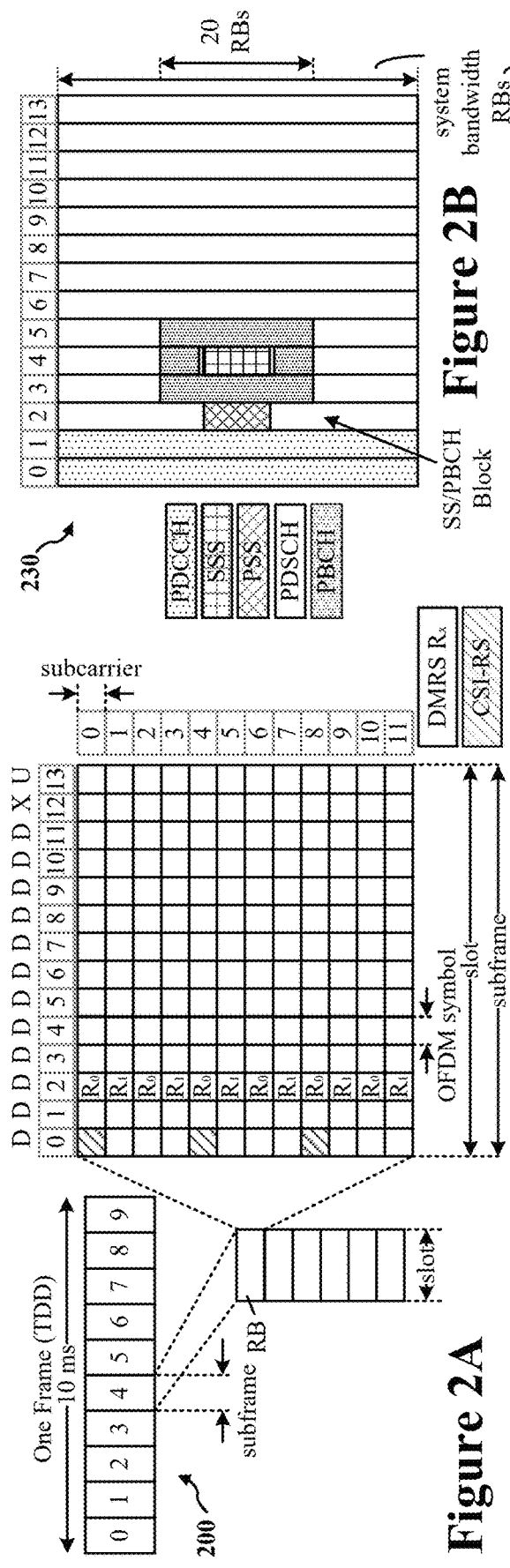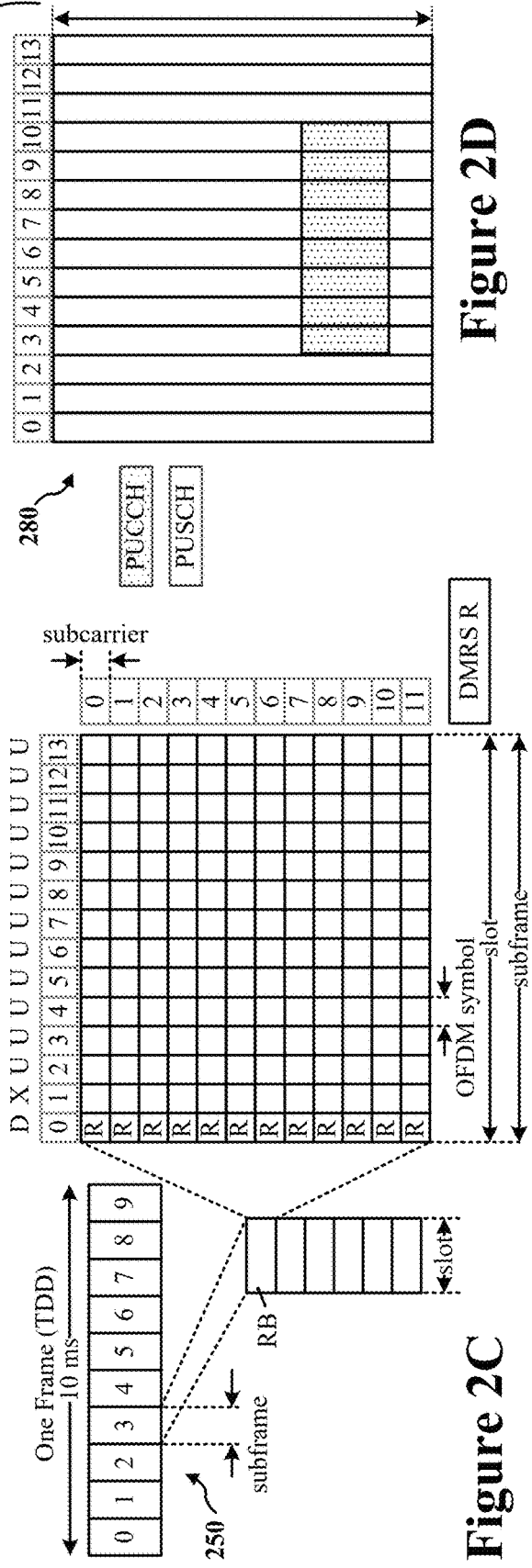

TIMER-BASED SWITCHING FOR MULTIPLE ACTIVE BANDWIDTH PARTS

CROSS REFERENCE

The present Application is a 371 national stage filing of International PCT Application No. PCT/US2021/041309 by ABOTABL et al. entitled "TIMER-BASED SWITCHING FOR MULTIPLE ACTIVE BANDWIDTH PARTS," filed Jul. 12, 2021; and claims priority to Greece Provisional Patent Application No. 2020/0100422 by ABOTABL et al., entitled "TIMER-BASED SWITCHING FOR MULTIPLE ACTIVE BANDWIDTH PARTS (BWPS)," filed Jul. 17, 2020, each of which is assigned to the assignee hereof, and each of which is expressly incorporated by reference in its entirety herein.

TECHNICAL FIELD

This disclosure relates generally to wireless communication and, more specifically, to timer-based switching of multiple active bandwidth parts (BWPs) used in wireless communications.

DESCRIPTION OF THE RELATED TECHNOLOGY

Wireless communication systems are widely deployed to provide various telecommunication services such as telephony, video, data, messaging, and broadcasts. In some cases, wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR), which is part of a continuous mobile broadband evolution promulgated by Third Generation Partnership Project (3GPP) to meet new requirements associated with latency, reliability, security, scalability (e.g., with Internet of Things (IoT)), and other requirements. In some cases, 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

In some cases, 5G networks can support substantially wider carrier bandwidths than legacy networks operating in accordance with older radio access technologies (such as LTE). Wider bandwidths may allow for higher achievable data rates in 5G networks. However, in some cases, increasing bandwidth usage may also increase the power consumption of wireless communication devices, even at idle. Moreover, data requirements may vary for different user equipment (UEs) at different times. For example, some UEs may not need, or even support, the maximum data rates achievable in a 5G network. As a result, 5G networks may allocate smaller portions of the carrier bandwidth to individual UEs based on the traffic profiles of each UE.

A bandwidth part (BWP) is a set of contiguous resource blocks of a carrier bandwidth. More specifically, a BWP represents a limited range of frequencies on which a UE can communicate with a 5G network. Each UE can be assigned up to 4 BWPs to be used for wireless communications in a given direction (uplink or downlink). For example, a UE may be allocated 4 BWPs for uplink communications and another 4 BWPs for downlink communications. However, for each direction, only 1 BWP can be active at any given time. A UE generally may not receive downlink communications outside of the active downlink BWP nor transmit uplink communications outside of the active uplink BWP. This may reduce the number of wireless channels the UE may monitor, thus reducing the processing overhead and power consumption of the UE. As 5G NR technology continues to evolve, it may be desirable to adapt BWPs to support new wireless communication techniques.

BRIEF DESCRIPTION OF THE DRAWINGS

FIGS. 2A, 2B, 2C, and 2D illustrate examples of a first 5G NR frame, downlink (DL) channels within a 5G NR slot, a second 5G NR frame, and uplink (UL) channels within a 5G NR slot, respectively that support timer-based switching for multiple active BWPs in accordance with aspects of the present disclosure.

SUMMARY

Figure 1:
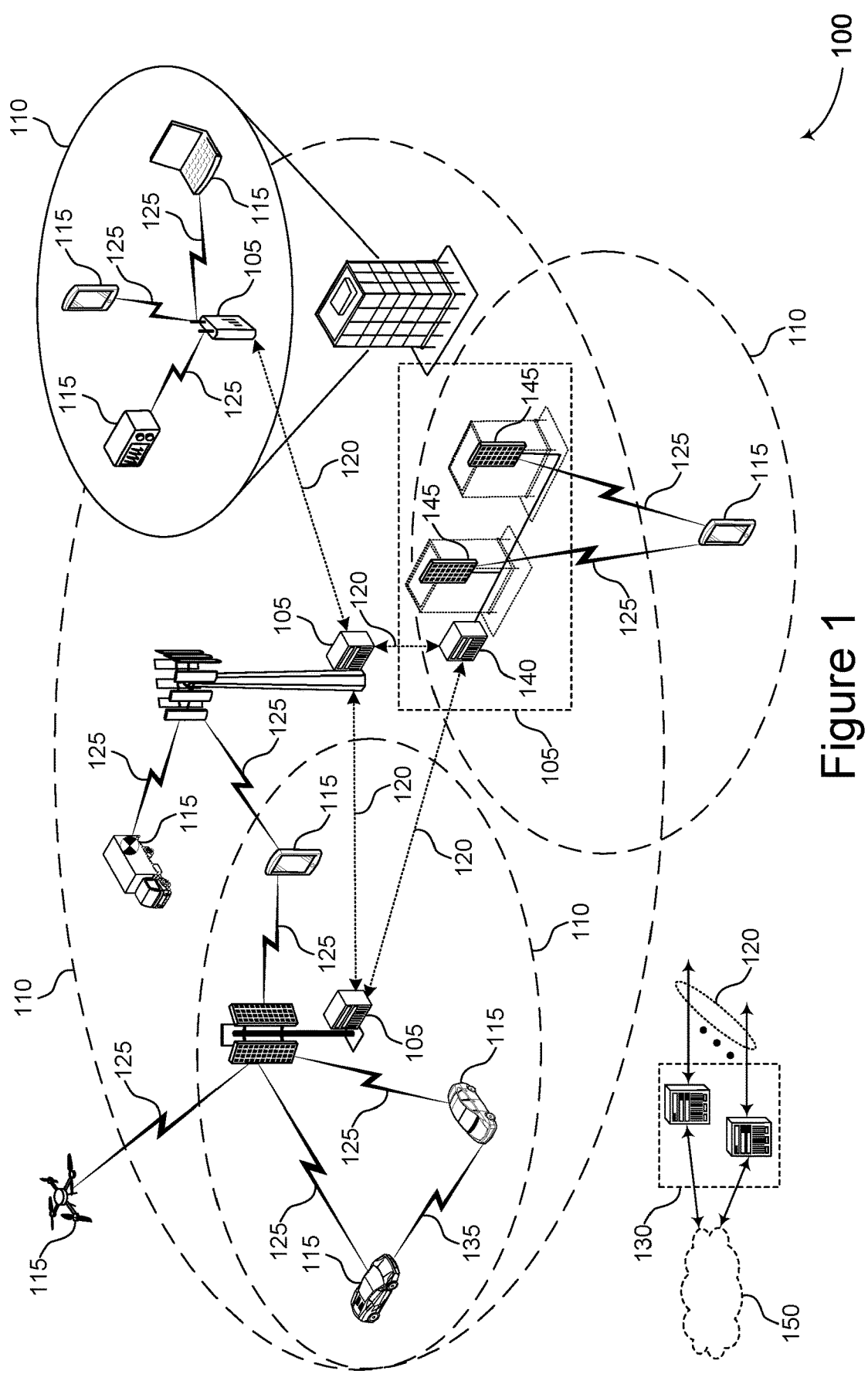
FIG. 1 illustrates an example of a wireless communications system that supports timer-based switching for multiple active bandwidth parts (BWPs) in accordance with aspects of the present disclosure.

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method may include activating a first bandwidth part (BWP) representing a first range of frequencies to be used for communications in a first direction with a base station, the first direction being one of a downlink direction or an uplink direction, activating a second BWP representing a second range of frequencies to be used for communications in the first direction with the base station, the second BWP being active concurrently with the first BWP, initiating a first timer responsive to the activation of the first BWP or the activation of the second BWP, the first timer being configured to expire after a first elapsed duration, and changing a status of at least one of the first BWP or the second BWP based on the expiration of the first timer.

Another innovative aspect of the subject matter described in this disclosure can be implemented in an apparatus for wireless communication. The apparatus may include a processor, memory coupled with the processor, and instructions stored in the memory. The instructions may be executable by the processor to cause the apparatus to activate a first BWP representing a first range of frequencies to be used for communications in a first direction with a base station, the first direction being one of a downlink direction or an uplink direction, activate a second BWP representing a second range of frequencies to be used for communications in the first direction with the base station, the second BWP being active concurrently with the first BWP, initiate a first timer responsive to the activation of the first BWP or the activation of the second BWP, the first timer being configured to expire after a first elapsed duration, and change a status of at least one of the first BWP or the second BWP based on the expiration of the first timer.

Another innovative aspect of the subject matter described in this disclosure can be implemented in an apparatus for wireless communication. The apparatus may include means for activating a first BWP representing a first range of frequencies to be used for communications in a first direction with a base station, the first direction being one of a downlink direction or an uplink direction, means for activating a second BWP representing a second range of frequencies to be used for communications in the first direction with the base station, the second BWP being active concurrently with the first BWP, means for initiating a first timer responsive to the activation of the first BWP or the activation of the second BWP, the first timer being configured to expire after a first elapsed duration, and means for changing a status of at least one of the first BWP or the second BWP based on the expiration of the first timer.

One innovative aspect of the subject matter described in this disclosure can be implemented in a non-transitory computer readable medium storing code for wireless communication. The code may include instructions executable by a processor to activate a first bandwidth part (BWP) representing a first range of frequencies to be used for communications in a first direction with a base station, the first direction being one of a downlink direction or an uplink direction, activate a second BWP representing a second range of frequencies to be used for communications in the first direction with the base station, the second BWP being active concurrently with the first BWP, initiate a first timer responsive to the activation of the first BWP or the activation of the second BWP, the first timer being configured to expire after a first elapsed duration, and change a status of at least one of the first BWP or the second BWP based on the expiration of the first timer.

DETAILED DESCRIPTION

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an interne of things (IOT) network.

Some base stations are capable of transmitting downlink (DL) data to one or more user equipment (UEs) while concurrently receiving uplink (UL) data from one or more UEs. Similarly, some UEs are capable of receiving DL data from a base station while concurrently transmitting UL data to the base station. In some cases, a slot that supports concurrent UL and DL communications may be referred to as a "full-duplex" (FD) slot. Similarly, a slot that supports communications in only one direction (either UL or DL) may be referred to as a "half-duplex" (HD) slot. In some aspects, the range of frequencies used for DL or UL communications in an HD slot may be different than the range of frequencies used for DL or UL communications in an adjacent FD slot. Thus, it may be desirable to switch between different bandwidth parts (BWPs) when transitioning between HD and FD slots. As described above, existing versions of the 5G standards specify that only one BWP can be active for communications in a given direction (such as in the UL or the DL) at any one time. Changing the active BWP typically requires may have considerable switching time which can delay or interrupt communications when transitioning between HD and FD slots.

Various implementations relate generally to FD communications in wireless networks, and some implementations more specifically relate to having multiple active BWPs, concurrently, for communications in a given direction (such as a DL direction or a UL direction) between a UE and a base station. In some cases, some implementations relate to activating multiple active BWPs, concurrently, for communications in a given direction between a UE and a base station. For example, a first active BWP may be used for DL or UL communications in an HD slot and a second active BWP may be used for DL or UL communications in an adjacent FD slot. Because the first and second active BWPs may be concurrently active, the UE may require little or no switching time to transition between the HD and FD slots. In some implementations, the UE may assign the first active BWP to a main role (referred to herein as the "main BWP") and may further assign the second active BWP to a secondary role (referred to herein as the "secondary BWP"). In some aspects, the UE may monitor a physical downlink control channel (PDCCH) in the main BWP and not other BWPs including not in the secondary BWP. The PDCCH may schedule a physical downlink shared channel (PDSCH) in the main BWP, the secondary BWP, or both. Further, the UE may change a status of one or more active BWPs after a given amount of time has elapsed. For example, the UE may initiate one or more timers responsive to activating the first and second active BWPs. In some aspects, a single inactivity timer may be associated with the first and second active BWPs, where expiration of the inactivity timer triggers the UE to switch the first and second active BWPs to a default BWP. In some other aspects, a respective inactivity timer may be associated with each of the first and second active BWPs, where expiration of each inactivity timer triggers the UE to deactivate the associated active BWP or switch the active BWP to a default BWP. Still further, in some aspects, a switching timer may be associated with the main BWP, where expiration of the switching timer triggers the UE to switch the role of the main BWP from the first active BWP to the second active BWP. The UE may further deactivate the first active BWP or reassign the first active BWP to the secondary role responsive to the expiration of the switching timer.

Particular implementations of the subject matter described in this disclosure can be implemented to realize one or more of the following potential advantages. By maintaining multiple active BWPs, aspects of the present disclosure may improve the efficiency of FD communications in networks, such as 5G networks. For example, a UE may use a first active BWP for DL (or UL) communications in an HD slot and a second active BWP for DL (or UL) communications in an adjacent FD slot. The first and second active BWPs may be concurrently active, and the UE may transition between the HD and FD slots with minimal delay or interruption in communications with the base station. Moreover, by changing a status of one or more active BWPs after a given amount of time has elapsed, the UE may gradually revert to a lower power configuration. For example, upon expiration of one or more timers, the UE may deactivate one or more of the active BWPs or reduce the range of frequencies associated with an active BWP (such as by switching an active BWP to a default BWP or reassigning the role of the main BWP).

Aspects of the disclosure are initially described in the context of wireless communications systems. Aspects of the disclosure are then described in the context of 5G NR frames, DL and UL channels within 5G NR frames, block diagrams, slot configurations, frequency diagrams, and sequence diagrams. Aspects of the disclosure are further illustrated by and described with reference to apparatus diagrams, system diagrams, and flowcharts that relate to timer-based switching for multiple active BWPs.

FIG. 1 illustrates an example of a wireless communications system 100 that supports timer-based switching for multiple active BWPs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$, may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCI), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

FIG. 2A shows an example of a first slot 200 within a 5G NR frame structure. FIG. 2B shows an example of DL channels 230 within a 5G NR slot. FIG. 2C shows an example of a second slot 250 within a 5G NR frame structure. FIG. 2D shows an example of UL channels 280 within a 5G NR slot. The 5G NR frame structure may be FDD in which, for a particular set of subcarriers (carrier system bandwidth), slots within the set of subcarriers are dedicated for either DL or UL. In other cases, the 5G NR frame structure may be TDD in which, for a particular set of subcarriers (carrier system bandwidth), slots within the set of subcarriers are dedicated for both DL and UL.

In yet other cases, the 5G NR frame structure may be position division duplex, in which for a particular set of subcarriers (carrier system bandwidth), spatial domain filters (e.g., beams, transmission directions, transmission locations, coverage regions) are dedicated for either DL or UL or both DL and UL. In other words, using position division duplex, a device may multiplex communications with other devices using the spatial domain as another degree of freedom. In some cases, the 5G NR frame structure may support cross division duplex, where devices may combine TDD and FDD, simultaneously operating UL and DL on a same TDD carrier, but on different frequency resources, resulting in significant self-interference (e.g., interference between a first antenna panel and a second antenna panel at a device). Devices configured to use cross division duplex may be configured to mitigate such self-interference, for example, by forming electromagnetic barriers between antenna panels, nonlinear channel estimation procedures, and the like.

In the examples shown in FIGS. 2A and 2C, the 5G NR frame structure is configured as TDD, with slot 4 being configured with slot format 28 (with mostly DL), where D indicates DL, U indicates UL, and X indicates that the slot is flexible for use between DL/UL, and slot 3 being configured with slot format 34 (with mostly UL). While slots 3 and 4 are shown with slot formats 34 and 28, respectively, any particular slot may be configured with any of the various available slot formats 0-61. Slot formats 0 and 1 are all DL and all UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). This format may also apply to a 5G NR frame structure that is FDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology μ=5 has a subcarrier spacing of 480 kHz. The symbol length/duration is inversely related to the subcarrier spacing.

FIGS. 2A-2D provide an example of slot configuration that supports timer-based switching for multiple active BWPs in accordance with aspects of the present disclosure. The slot configuration may have 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as a physical RB (PRB)) that extends across 12 consecutive subcarriers and across a number of symbols. The intersections of subcarriers and symbols of the RB define multiple resource elements (REs). The number of bits carried by each RE depends on the modulation scheme.

As illustrated in FIG. 2A, some of the REs carry a reference (pilot) signal (RS) for the UE 115. In some configurations, one or more REs may carry a demodulation RS (DM-RS) (indicated as Rx for one particular configuration, where 100x is the port number, but other DM-RS configurations are possible). In some configurations, one or more REs may carry a channel state information reference signal (CSI-RS) for channel measurement at the UE. The REs may also include a beam measurement RS (BRS), a beam refinement RS (BRRS), and a phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS may be used by a UE 115 to determine subframe or symbol timing and a physical layer identity. A secondary synchronization signal (SSS) may be within symbol 4 of particular subframes of a frame. The SSS may be used by a UE 115 to determine a physical layer cell identity group number and radio frame timing. Based on the physical layer identity and the physical layer cell identity group number, the UE 115 can determine a PCI. Based on the PCI, the UE 115 may determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) may carry user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE 115 may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE 115 may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK)/negative ACK (HACK) feedback. The PUSCH carries data and may additionally be used to carry a buffer status report (BSR), a power headroom report (PHR), and/or UCI.

Figure 3:
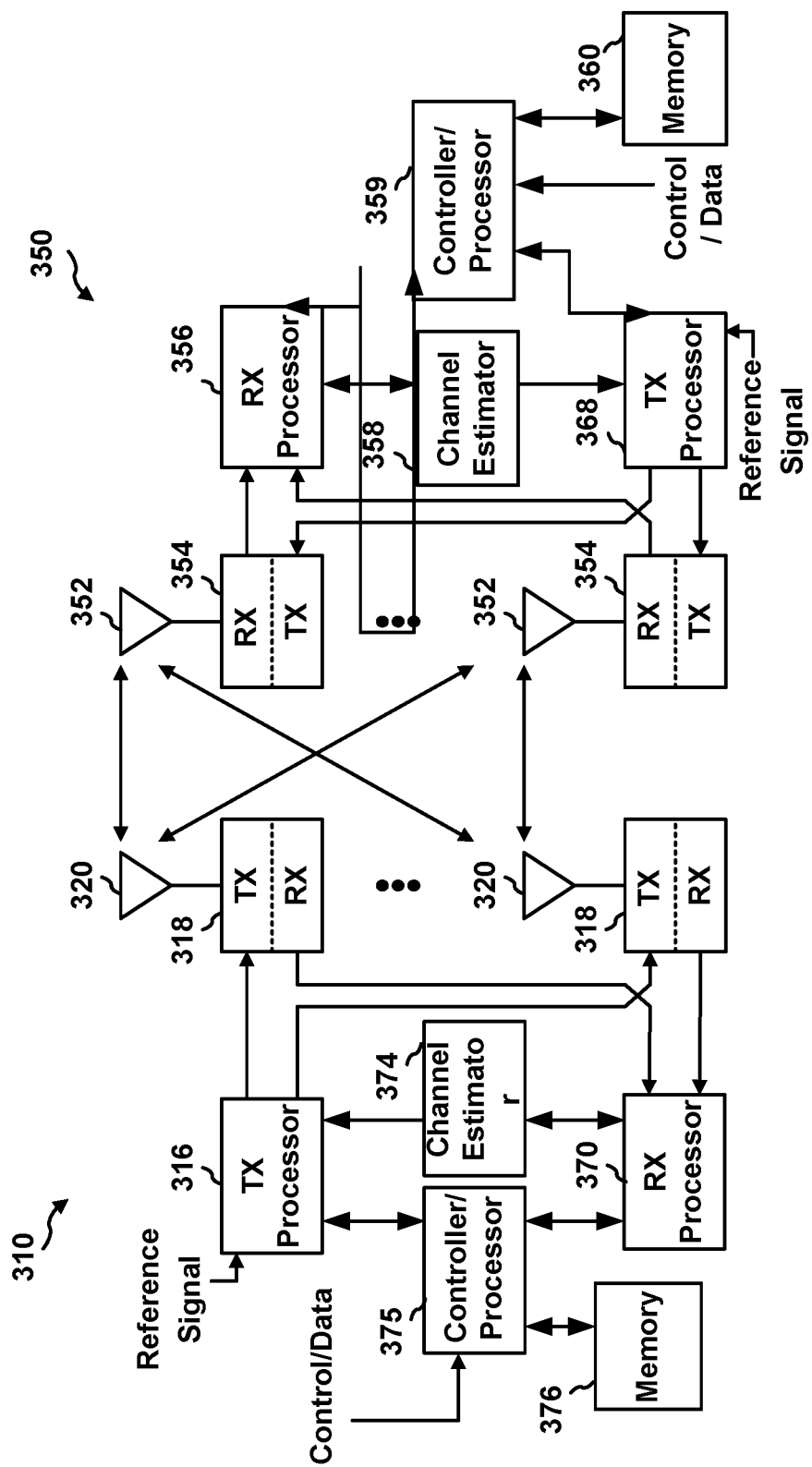
FIG. 3 shows a block diagram of an example base station and user equipment (UE) in an access network that supports timer-based switching for multiple active BWPs in accordance with aspects of the present disclosure.

FIG. 3 shows a block diagram of an example base station 310 and UE 350 in an access network that supports timer-based switching for multiple active BWPs in accordance with aspects of the present disclosure. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE

350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations. Information to be wirelessly communicated (such as for LTE or NR based communications) is encoded and mapped, at the PHY layer, to one or more wireless channels for transmission.

As described above, a BWP is a set of contiguous resource blocks of a carrier bandwidth. More specifically, a BWP represents a limited range of frequencies on which a UE can communicate with a 5G network. Each UE can be assigned up to 4 BWPs to be used for wireless communications in a given direction (UL or DL). For example, a UE may be allocated 4 BWPs for UL communications and another 4 BWPs for DL communications. However, in some cases, 1 BWP can be active at any given time. In some cases, a UE may not receive DL communications outside of an active DL BWP nor transmit UL communications outside of an active UL BWP. This reduces the number of wireless channels the UE is required to monitor, thus reducing the processing overhead and power consumption of the UE.

Some base stations are capable of transmitting DL data to one or more UEs while concurrently receiving UL data from one or more UEs. Similarly, some UEs are capable of receiving DL data from a base station while concurrently transmitting UL data to the base station. As described above, in accordance with the 5G NR frame structure, a slot that supports concurrent UL and DL communications may be referred to as a "full-duplex" (FD) slot. Similarly, a slot that supports communications in only one direction (either UL or DL) may be referred to as a "half-duplex" (HD) slot. In some aspects, the range of frequencies used for DL or UL communications in an HD slot may be different than the range of frequencies used for DL or UL communications in an adjacent FD slot. In some cases, devices may be configured to switch between different BWPs when transitioning between HD and FD slots. However, changing the active BWP may take considerable switching time which can delay or interrupt communications when transitioning between HD and FD slots.

Various implementations relate generally to FD communications in wireless networks. Some implementations more specifically relate to activating multiple BWPs, concurrently, for communications in a given direction (such as a DL direction or a UL direction) between a UE and a base station. For example, a first active BWP may be used for DL or UL communications in an HD slot and a second active BWP may be used for DL or UL communications in an adjacent FD slot. Because the first and second BWPs may be concurrently active, the UE may require little or no switching time to transition between the HD and FD slots. In some implementations, the UE may assign the first active BWP to a main role (referred to herein as the "main BWP") and may further assign the second active BWP to a secondary role (referred to herein as the "secondary BWP"). In some aspects, the UE may monitor a PDCCH only in the main BWP. The PDCCH may schedule a PDSCH in the main BWP, the secondary BWP, or both. Accordingly, in such aspects, the UE may access the secondary BWP only when a PDSCH is scheduled in the secondary BWP.

In some implementations, the UE may further change a status of one or more active BWPs after an amount of time has elapsed. For example, the UE may initiate one or more timers responsive to activating the first and second BWPs. In some aspects, a single inactivity timer may be associated with the first and second BWPs, where expiration of the inactivity timer triggers the UE to switch the first and second BWPs to a default BWP. In some other aspects, a respective inactivity timer may be associated with each of the first and second BWPs, where expiration of each inactivity timer triggers the UE to deactivate the associated BWP or switch the BWP to a default BWP. Still further, in some aspects, a switching timer may be associated with the main BWP, where expiration of the switching timer triggers the UE to switch the role of the main BWP from the first BWP to the second BWP. The UE may further deactivate the first BWP or reassign the first BWP to the secondary role responsive to the expiration of the switching timer.

Particular implementations of the subject matter described in this disclosure can be implemented to realize one or more of the following potential advantages. By maintaining multiple active BWPs, aspects of the present disclosure may improve the efficiency of FD communications in 5G networks. For example, a UE may use a first BWP for DL (or UL) communications in an HD slot and a second BWP for DL (or UL) communications in an adjacent FD slot. Because the first and second BWPs may be concurrently active, the UE can transition between the HD and FD slots with minimal delay or interruption in communications with the base station. Moreover, by changing a status of one or more active BWPs after a given amount of time has elapsed, the UE may gradually revert to a lower power configuration. For example, upon expiration of one or more timers, the UE may deactivate one or more of the BWPs or reduce the range of frequencies associated with an active BWP (such as by switching an active BWP to a default BWP or reassigning the role of the main BWP).

Figure 4:
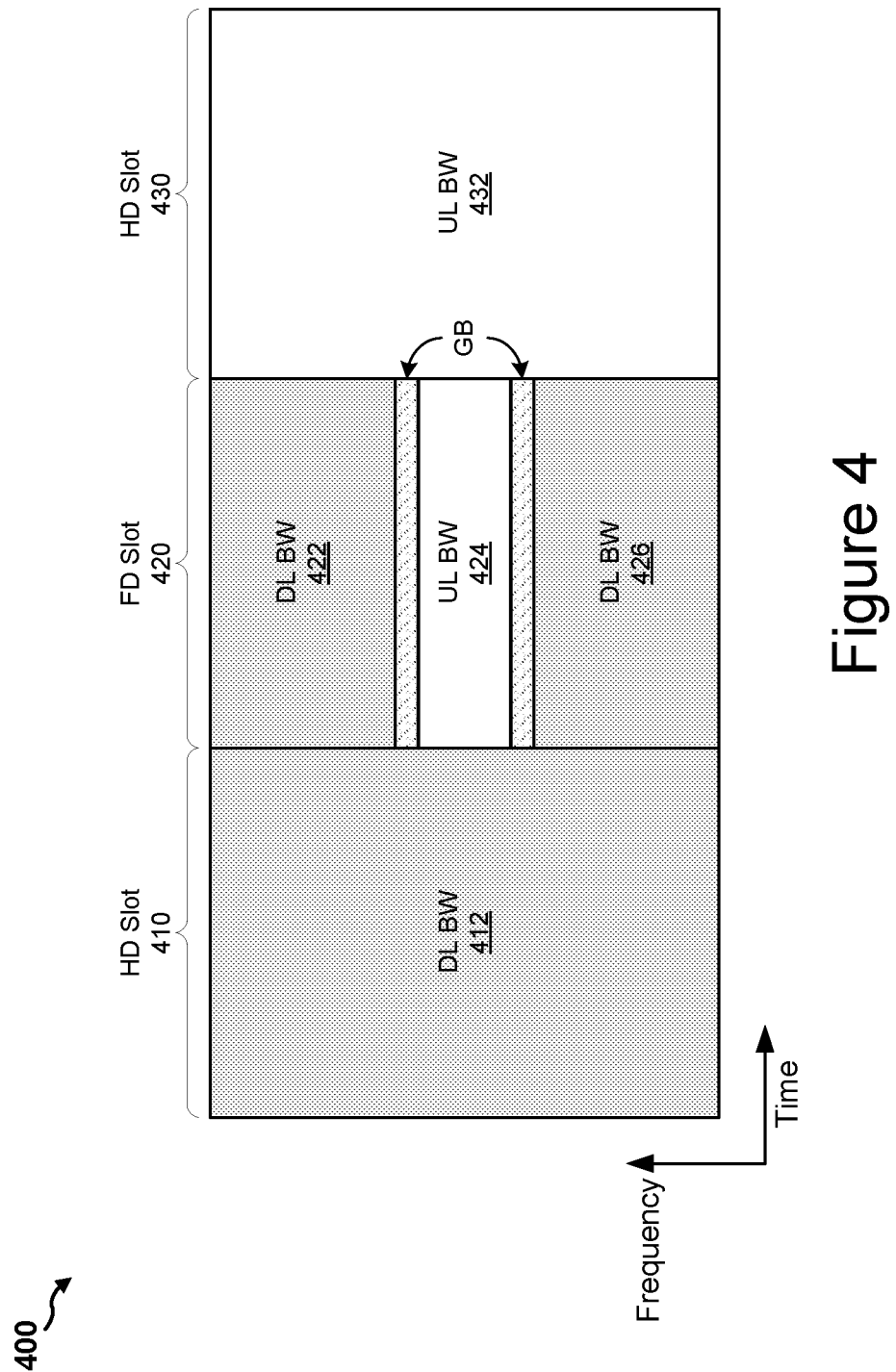
FIG. 4 shows example slot configurations for a 5G NR frame that support timer-based switching for multiple active BWPs in accordance with aspects of the present disclosure.

FIG. 4 shows example slot configurations for a 5G NR frame 400 that support timer-based switching for multiple active BWPs in accordance with aspects of the present disclosure. The example 5G NR frame 400 may be used for DL and UL communications between a UE and a base station. For simplicity, only three slots 410-430 are depicted for the example 5G NR frame 400. In the example of FIG. 4, the first slot 410 is configured as an HD slot for DL communications, the second slot 420 is configured as an FD slot for concurrent UL and DL communications, and the third slot 430 is configured as an HD slot for UL communications. As used herein, the term "DL bandwidth" may refer to a range of frequencies that may be used for DL communications (including PDCCH and PDSCH, among other examples), and the term "UL bandwidth" may refer to a range of frequencies that may be used for UL communications (including PUCCH and PUSCH, among other examples).

As shown in FIG. 4, the first slot 410, which may also be referred to as HD slot 410, provides a DL bandwidth (BW) 412 that spans a frequency range associated with the first slot 410. Similarly, the third slot 430, which may also be referred to as HD slot 430, provides a UL bandwidth 432 that spans a frequency range associated with the third slot 430. In contrast, the second slot 420, which may also be referred to as FD slot 420, provides a UL bandwidth 424 that spans a center portion of a frequency range associated with the second slot 420, and further provides DL bandwidths 422 and 426 that span the remainder of the frequency range (on either side of the UL bandwidth 424). Guard bands (GB) further separate the UL bandwidth 424 from the DL bandwidths 422 and 426. In the example of FIG. 4, the DL bandwidths 422 and 426 are allocated on opposite sides of the UL bandwidth 424. However, other allocations of DL and UL bandwidths are also possible. For example, in some other implementations, the UL and DL bandwidth allocations may be reversed. Still further, in some implementations, a DL bandwidth may span an upper (or lower) portion of the frequency range associated with second slot 420 and a UL bandwidth may span a lower (or upper) portion of the frequency range associated with second slot 420.

Different slots within a 5G NR frame may encompass different frequency ranges. For example, although not drawn to scale, HD slot 410 may span a different range of frequencies than FD slot 420. Accordingly, the DL bandwidth 412 may be associated with a first BWP and the DL bandwidths 422 and 426 may be associated with a second BWP. In some cases, 1 BWP may be active for a given direction (such as the DL direction or the UL direction). As such, a UE may switch its active BWP from the first BWP to the second BWP when transitioning from the HD slot 410 to the FD slot 420. Switching the active BWP may require reconfiguration or tuning of the RF front end (RFFE), which can consume a substantial amount of time and resources. As a result, switching the active BWP between the HD slot 410 and the FD slot 420 may delay or interrupt DL communications between the UE and a corresponding base station.

In some implementations, a UE may activate multiple BWPs, concurrently, for communications in a given direction (such as the DL direction, the UL direction, or both). For example, the UE may activate the first BWP (associated with DL bandwidth 412) and the second BWP (associated with DL bandwidths 422 and 426), concurrently, prior to the start of the HD slot 410, such that the first and second BWPs remain active during the transition between the HD slot 410 and the FD slot 420. As the first BWP and the second BWP may be active during the transition from the HD slot 410 to the FD slot 420, the UE may require little or no switching time to switch communications from the first BWP to the second BWP. As a result, DL communications between the UE and the base station may resume with minimal delay or interruption.

The UE also may activate two (or more) BWPs for UL communications. For example, the UL bandwidths 424 and 432 may be associated with third and fourth BWPs, respectively. Thus, in some aspects, the UE may activate the third BWP and the fourth BWP, concurrently, prior to the start of the FD slot 420. In some other aspects, the UE may activate the fourth BWP during the FD slot 420 while the third BWP is already active. More specifically, the first, second, third, and fourth BWPs may be concurrently active at any given time. Because the third and fourth BWPs are concurrently active during the transition from the FD slot 420 to the HD slot 430, the UE may require little or no switching time to switch communications from the third BWP to the fourth BWP. As a result, UL communications between the UE and the base station may resume with minimal delay or interruption.

In some other implementations, a UE may use multiple active BWPs for DL or UL communications in the same slot. For example, as shown in FIG. 4, the DL bandwidth may be bifurcated by the UL bandwidth 424 (and corresponding guard bands). Accordingly, DL bandwidth 422 may be more precisely represented by a fifth BWP that spans only the upper portion of the frequency range associated with FD slot 420 and DL bandwidth 426 may be more precisely represented by a sixth BWP that spans only the lower portion of the frequency range. By activating the fifth and sixth BWPs, concurrently, for DL communications in the FD slot 420, the UE may reduce or minimize inter-channel interference between DL and UL communications in full-duplex operation.

In some implementations, a UE may monitor each active BWP for DL data. For example, the UE may monitor all physical signals and channels in multiple active BWPs, concurrently. However, aspects of the present disclosure recognize that monitoring multiple active BWPs may consume a substantial amount of the UE's power and other resources. Thus, in some other implementations, different roles may be assigned to different active BWPs for purposes of reducing the number of active BWPs monitored by the UE. More specifically, one of the active BWPs may be assigned a "main" role and the remaining one or more active BWPs may each be assigned a "secondary" role. In some aspects, the UE may monitor a PDCCH only in the main BWP. The PDCCH may schedule a PDSCH in the main BWP, a secondary BWP, or both. Accordingly, the UE may access the secondary BWP if a PDSCH is scheduled in the secondary BWP.

In some implementations, a UE may further reduce its power consumption by changing a status of one or more active BWPs after a given amount of time has elapsed. For example, in some cases, a default BWP may be used to mitigate DCI errors (where the UE fails to decode a DCI containing a BWP activation command). More specifically, a UE may revert to the default BWP as its active BWP if it does not receive an explicit BWP activation command before a threshold duration has elapsed. For example, the default BWP may encompass a narrower range of frequencies than any other BWPs configured for a given UE. In some implementations, a UE with multiple active BWPs may switch one or more active BWPs to a default BWP after a threshold duration has elapsed. In some other implementations, a UE with multiple active BWPs may reduce the number of active BWPs after a threshold duration has elapsed. Still further, in some implementations, a UE with multiple active BWPs may reassign the role of the main BWP to another active BWP after a threshold duration has elapsed. For example, the BWP initially assigned to the main role may encompass a wider range of frequencies, and thus consume more power, than any BWPs initially assigned to a secondary role.

Figure 5A:
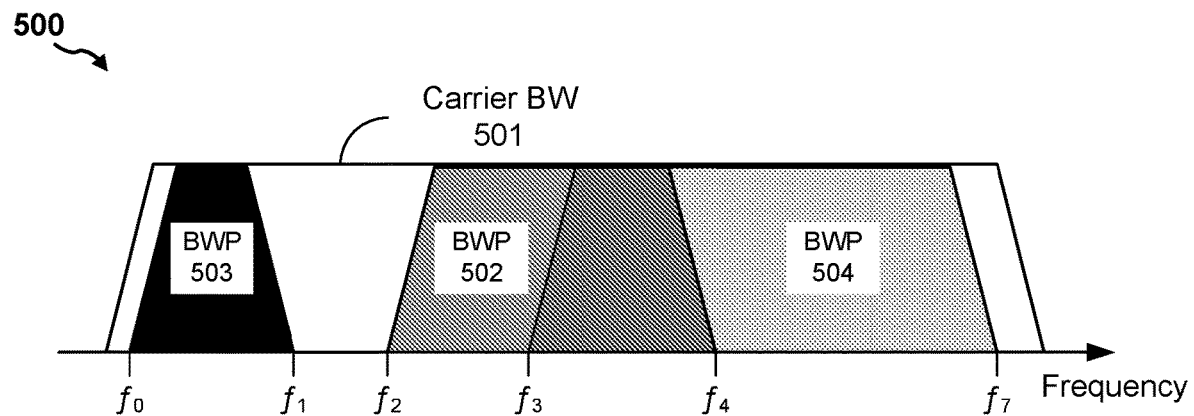
FIG. 5A shows a frequency diagram depicting a set of BWPs usable for communications between a base station and a UE that support timer-based switching for multiple active BWPs in accordance with aspects of the present disclosure.

FIG. 5A shows a frequency diagram 500 depicting a set of BWPs usable for communications between a base station and a UE that support timer-based switching for multiple active BWPs in accordance with aspects of the present disclosure. As shown in FIG. 5A, a carrier bandwidth (BW) 501 may be apportioned into multiple BWPs 503, 502, and 504. BWP 503 spans a range of frequencies f0-f1, BWP 502 spans a range of frequencies f2-f4, and BWP 504 spans a range of frequencies f3-f7. In the example of FIG. 5A, the range of frequencies associated with BWP 502 overlaps the range of frequencies associated with BWP 504. However, in some other implementations, BWP 502 and BWP 504 may not overlap. In some implementations, the UE may activate BWP 502 and BWP 504, concurrently, for communications in a given direction (DL or UL) in HD and FD slots, respectively, and may use BWP 503 as a default BWP. With reference for example to FIG. 4, BWP 502 may be associated with DL bandwidth 412 and BWP 504 may be associated with DL bandwidths 422 and 426.

Figure 5B:
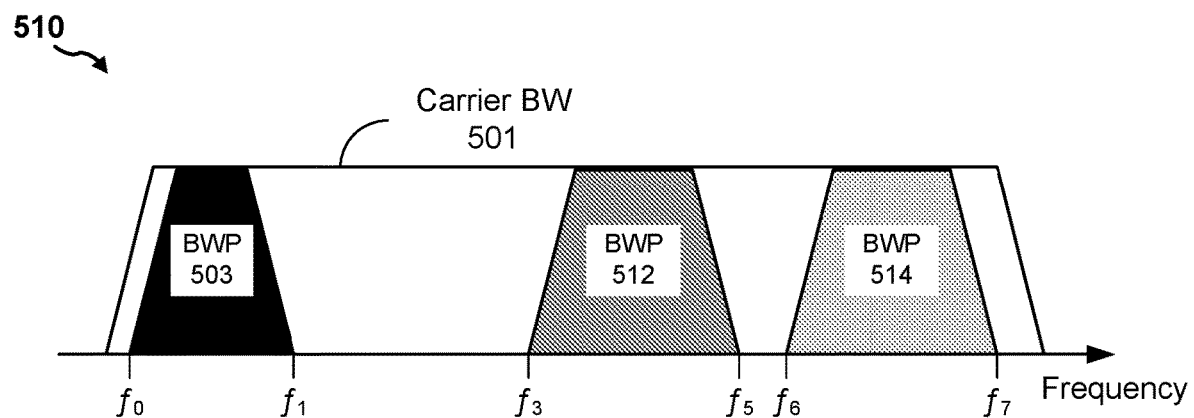
FIG. 5B shows another frequency diagram depicting a set of BWPs usable for communications between a base station and a UE that support timer-based switching for multiple active BWPs in accordance with aspects of the present disclosure.

FIG. 5B shows another frequency diagram 510 depicting a set of BWPs usable for communications between a base station and a UE according to some implementations. As shown in FIG. 5B, the carrier bandwidth 501 may be apportioned into multiple BWPs 503, 512, and 514. With reference for example to FIG. 5A, BWP 512 spans a range of frequencies f3-f5 coinciding with a lower portion of BWP 504 and BWP 514 spans a range of frequencies f6-f7 coinciding with an upper portion of BWP 504. In the example of FIG. 5B, the range of frequencies associated with BWP 512 does not overlap the range of frequencies associated with BWP 514. However, in other implementations, BWP 512 and BWP 514 may overlap. In some implementations, the UE may activate BWP 512 and BWP 514, concurrently, for communications in a given direction (DL or UL) in an FD slot, and may use BWP 503 as a default BWP. With reference for example to FIG. 4, BWP 512 may be associated with DL bandwidth 426 and BWP 514 may be associated with DL bandwidth 422.

Figure 6:
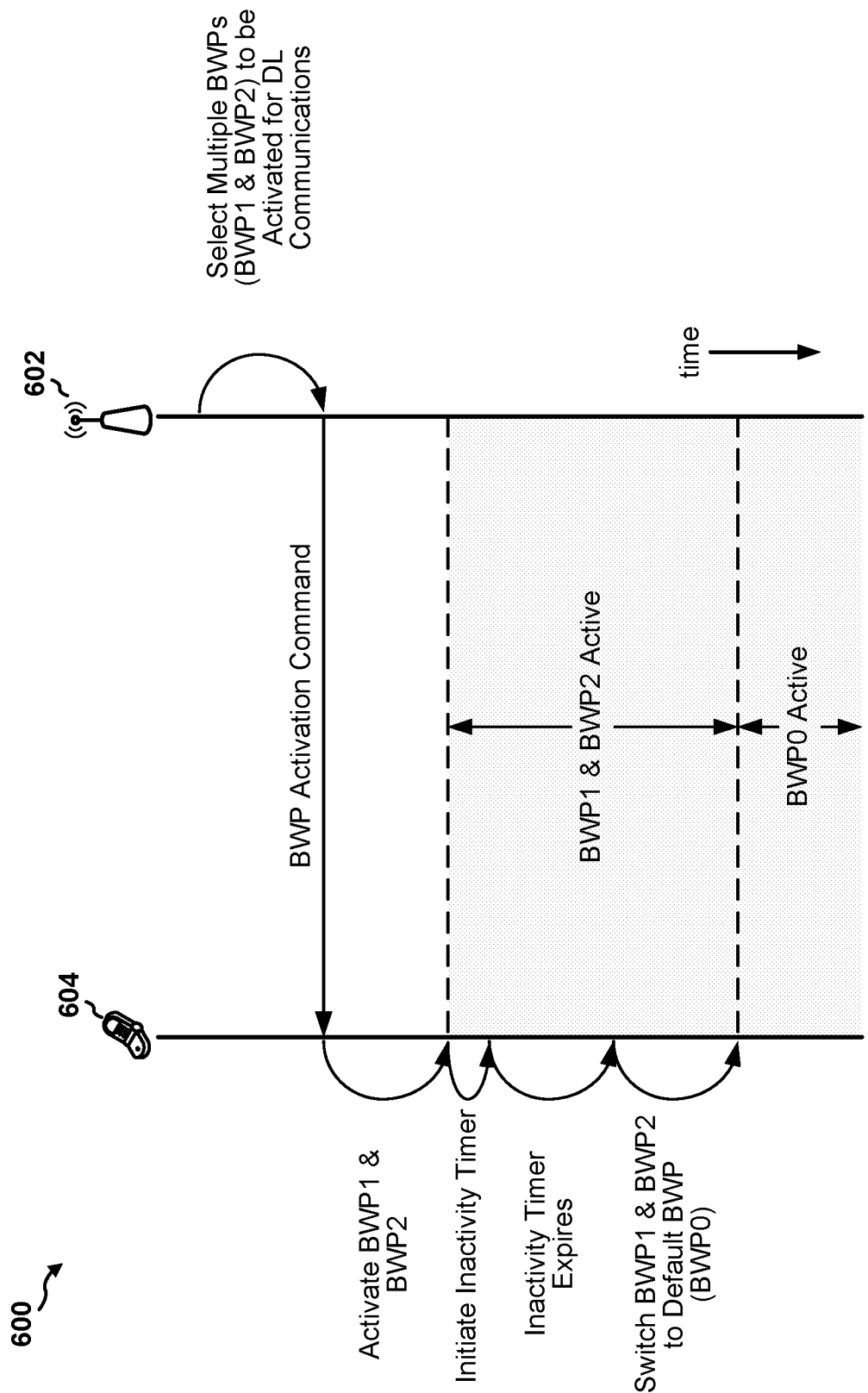
FIG. 6 shows a sequence diagram depicting example communications between a UE and a base station that support timer-based switching for multiple active BWPs in accordance with aspects of the present disclosure.

FIG. 6 shows a sequence diagram 600 depicting example communications between a UE 604 and a base station 602 that support timer-based switching for multiple active BWPs in accordance with aspects of the present disclosure. In some implementations, the base station 602 may be one example of the base station 105 of FIG. 1, the UE 604 may be one example of the UE 115 of FIG. 1, and the access network may be a 5G NR network. The base station 602 may be any suitable base station or node including, for example, a gNB or an eNB.

The base station 602 may select multiple bandwidth parts BWP1 and BWP2 to be activated for communications in a given direction (DL or UL) with the UE 604. In the example of FIG. 6, BWP1 and BWP2 are used for DL communications. However, in some other implementations, BWP1 and BWP2 may be used for UL communications in a substantially similar manner as described herein. In some implementations, BWP1 may be used for DL communications in an HD slot and BWP2 may be used for DL communications in an FD slot (such as described with respect to FIG. 5A). In some other implementations, BWP1 and BWP2 may be used, concurrently, for downlink communications in an FD slot (such as described with respect to FIG. 5B).

The base station 602 transmits one or more BWP activation commands to the UE 604 to indicate the BWPs (BWP1 and BWP2) to be activated. The BWP activation commands may be carried in RRC messages, DCI messages, MAC control elements (CEs), or any combination thereof. The UE 604 receives the BWP activation commands from the base station 602 and activates BWP1 and BWP2 in response thereto. In some aspects, the UE 604 may activate BWP1 and BWP2 at substantially the same time. In some other aspects, the UE 604 may activate BWP1 and BWP2 at different times such that the BWPs are concurrently active for at least a given duration. In some implementations, the UE 604 may monitor each of the active BWPs, concurrently, for DL communications. In some other implementations, the UE 604 may assign one of the active BWPs to a main role and the other active BWP to a secondary role. Accordingly, the UE 604 may monitor a PDCCH only in the main BWP (such as described with respect to FIG. 4).

In some implementations, the UE 604 may initiate an inactivity timer in response to activating BWP1 and BWP2. The inactivity timer may be configured to expire after a threshold duration elapses. As long as the inactivity timer has not expired, BWP1 and BWP2 may remain active for DL communications between the base station 602 and the UE 604. Upon expiration of the inactivity timer, the UE 604 may switch each of its active BWPs to a default BWP (BWP0). For example, the UE 604 may deactivate BWP1 and BWP2 and activate BWP0 responsive to the expiration of the inactivity timer. Thereafter, BWP0 is the only active BWP for DL communications between the base station 602 and the UE 604 (until the base station 602 transmits a subsequent BWP activation command to the UE 604).

Figure 7A:
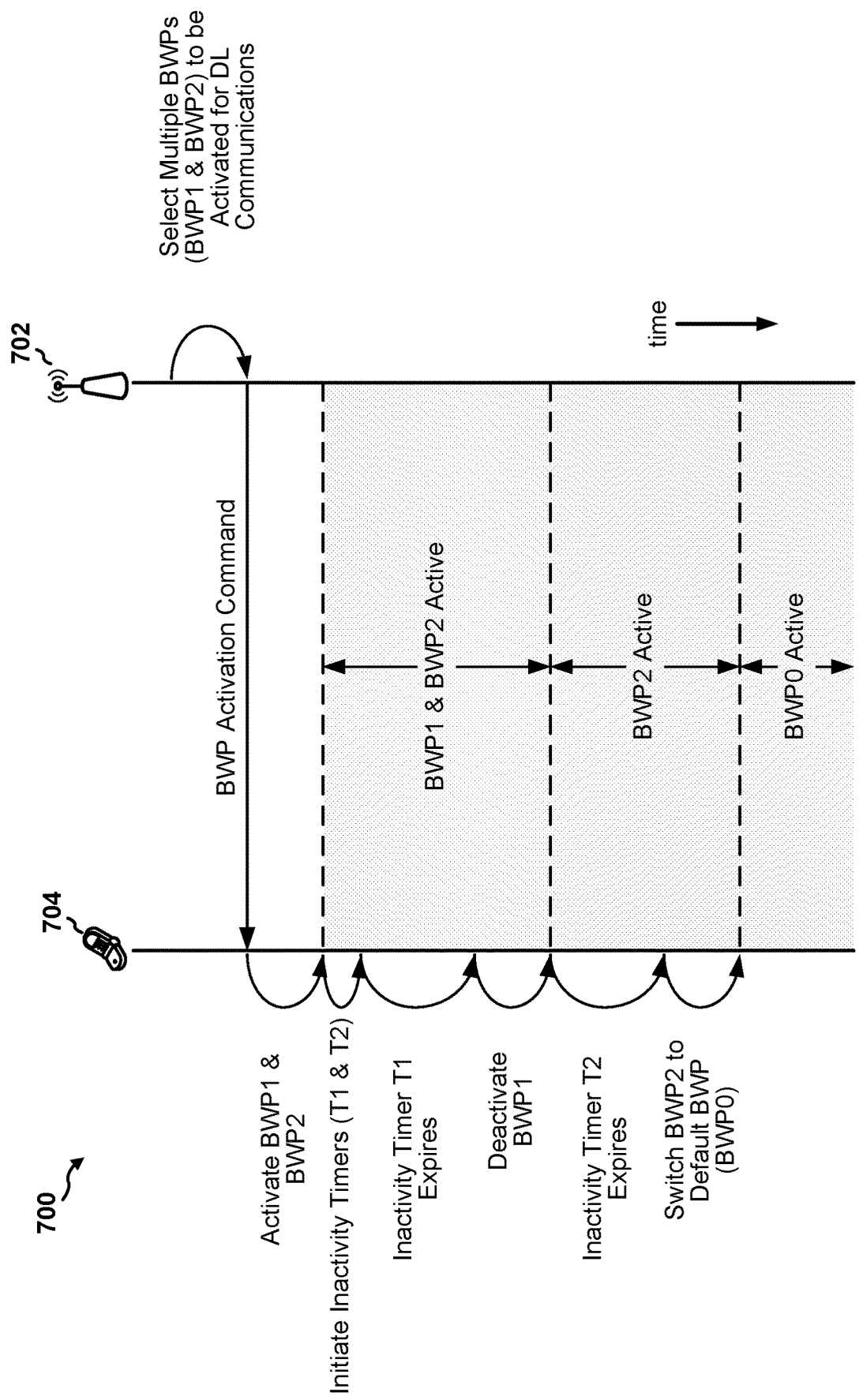
FIG. 7A shows a sequence diagram depicting example communications between a UE and a base station that support timer-based switching for multiple active BWPs in accordance with aspects of the present disclosure.

FIG. 7A shows a sequence diagram 700 depicting example communications between a UE 704 and a base station 702 that support timer-based switching for multiple active BWPs in accordance with aspects of the present disclosure. In some implementations, the base station 702 may be one example of the base station 105 of FIG. 1, the UE 704 may be one example of the UE 115 of FIG. 1, and the access network may be a 5G NR network. The base station 702 may be any suitable base station or node including, for example, a gNB or an eNB.

The base station 702 may select multiple bandwidth parts BWP1 and BWP2 to be activated for communications in a given direction (DL or UL) with the UE 704. In the example of FIG. 7A, BWP1 and BWP2 are used for DL communications. However, in some other implementations, BWP1 and BWP2 may be used for UL communications in a substantially similar manner as described herein. In some implementations, BWP1 may be used for DL communications in an HD slot and BWP2 may be used for DL communications in an FD slot (such as described with respect to FIG. 5A). In some other implementations, BWP1 and BWP2 may be used, concurrently, for downlink communications in an FD slot (such as described with respect to FIG. 5B).

The base station 702 transmits one or more BWP activation commands to the UE 704 to indicate the BWPs to be activated (BWP1 and BWP2). The BWP activation commands may be carried in RRC messages, DCI messages, MAC CEs, or any combination thereof. The UE 704 receives the BWP activation commands from the base station 702 and activates BWP1 and BWP2 in response thereto. In some aspects, the UE 704 may activate BWP1 and BWP2 at substantially the same time. In some other aspects, the UE 704 may activate BWP1 and BWP2 at different times such that the BWPs are concurrently active for at least a given duration. In some implementations, the UE 704 may monitor each of the active BWPs, concurrently, for DL communications. In some other implementations, the UE 704 may assign one of the active BWPs to a main role and the other active BWP to a secondary role. Accordingly, the UE 704 may monitor a PDCCH only in the main BWP (such as described with respect to FIG. 4).

In some implementations, the UE 704 may initiate multiple inactivity timers T1 and T2 in response to activating BWP1 and BWP2, respectively. Timer T1 may be configured to expire after a first threshold duration elapses and timer T2 may be configured to expire after a second threshold duration elapses. In the example of FIG. 7A, the first duration is shorter than the second duration. In some implementations, the UE 704 may deactivate BWP1 responsive to the expiration of timer T1 and may deactivate BWP2 responsive to the expiration of timer T2. As long as neither of the timers T1 or T2 has expired, BWP1 and BWP2 may remain concurrently active for DL communications between the base station 702 and the UE 704.

In the example of FIG. 7A, timer T1 expires sooner than timer T2. Upon expiration of timer T1, the UE 704 may deactivate BWP1 while BWP2 remains active. As a result, BWP2 is the only active BWP following the expiration of timer T1. Upon expiration of timer T2, the UE 704 may deactivate BWP2. Because there are no other active BWPs at this time, the UE 704 may switch the active BWP to a default BWP (BWP0). Thereafter, BWP0 is the only active BWP for DL communications between the base station 702 and the UE 704 (until the base station 702 transmits a subsequent BWP activation command to the UE 704).

Figure 7B:
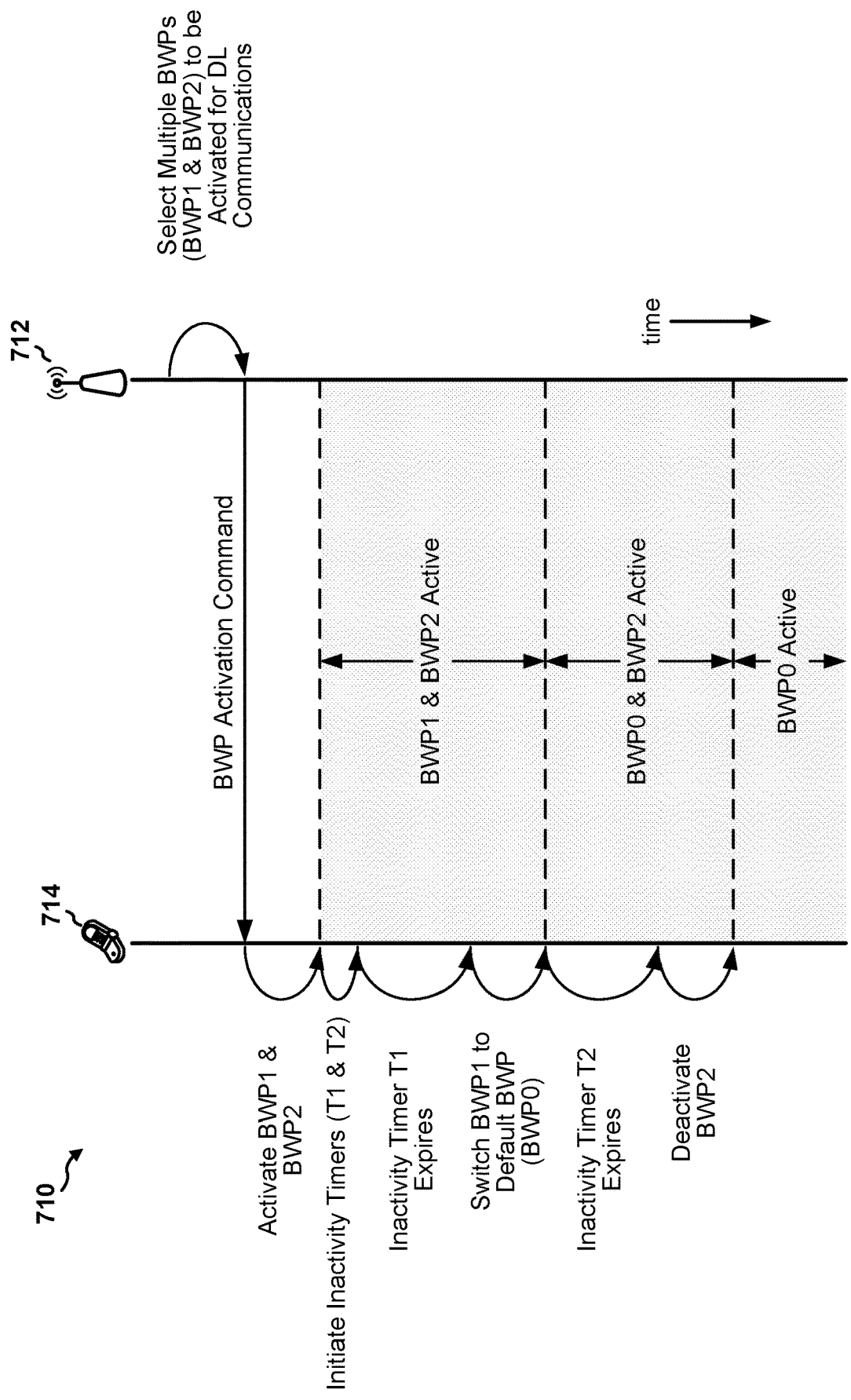
FIG. 7B shows another sequence diagram depicting example communications between a UE and a base station that support timer-based switching for multiple active BWPs in accordance with aspects of the present disclosure.

FIG. 7B shows another sequence diagram 710 depicting example communications between a UE 714 and a base station 712 that support timer-based switching for multiple active BWPs in accordance with aspects of the present disclosure. In some implementations, the base station 712 may be one example of the base station 105 of FIG. 1, the UE 714 may be one example of the UE 115 of FIG. 1, and the access network may be a 5G NR network. The base station 712 may be any suitable base station or node including, for example, a gNB or an eNB.

The base station 712 may select multiple bandwidth parts BWP1 and BWP2 to be activated for communications in a given direction (DL or UL) with the UE 714. In the example of FIG. 7B, BWP1 and BWP2 are used for DL communications. However, in some other implementations, BWP1 and BWP2 may be used for UL communications in a substantially similar manner as described herein. In some implementations, BWP1 may be used for DL communications in an HD slot and BWP2 may be used for DL communications in an FD slot (such as described with respect to FIG. 5A). In some other implementations, BWP1 and BWP2 may be used, concurrently, for downlink communications in an FD slot (such as described with respect to FIG. 5B).

The base station 712 transmits one or more BWP activation commands to the UE 714 to indicate the BWPs to be activated (BWP1 and BWP2). The BWP activation commands may be carried in RRC messages, DCI messages, MAC CEs, or any combination thereof. The UE 714 receives the BWP activation commands from the base station 712 and activates BWP1 and BWP2 in response thereto. In some aspects, the UE 714 may activate BWP1 and BWP2 at substantially the same time. In some other aspects, the UE 714 may activate BWP1 and BWP2 at different times such that the BWPs are concurrently active for at least a given duration. In some implementations, the UE 714 may monitor each of the active BWPs, concurrently, for DL communications. In some other implementations, the UE 714 may assign one of the active BWPs to a main role and the other active BWP to a secondary role. Accordingly, the UE 714 may monitor a PDCCH only in the main BWP (such as described with respect to FIG. 4).

In some implementations, the UE 714 may initiate multiple inactivity timers T1 and T2 in response to activating BWP1 and BWP2, respectively. Timer T1 may be configured to expire after a first threshold duration elapses and timer T2 may be configured to expire after a second threshold duration elapses. In the example of FIG. 7B, the first duration is shorter than the second duration. In some implementations, the UE 714 may switch BWP1 to a default BWP (BWP0) responsive to the expiration of timer T1 and may switch BWP2 to the default BWP responsive to the expiration of timer T2. As long as neither of the timers T1 or T2 has expired, BWP1 and BWP2 may remain concurrently active for DL communications between the base station 712 and the UE 714.

In the example of FIG. 7B, timer T1 expires sooner than timer T2. Upon expiration of timer T1, the UE 714 may switch BWP1 to BWP0 while BWP2 remains active. As a result, BWP0 and BWP2 are concurrently active following the expiration of timer T1. Upon expiration of timer T2, the UE 714 may switch BWP2 to BWP0. Because BWP0 is already active, and because there are no other active BWPs at this time, the UE 714 may simply deactivate BWP2. Thereafter, BWP0 is the only active BWP for DL communications between the base station 712 and the UE 714 (until the base station 712 transmits a subsequent BWP activation command to the UE 714).

Figure 8A:
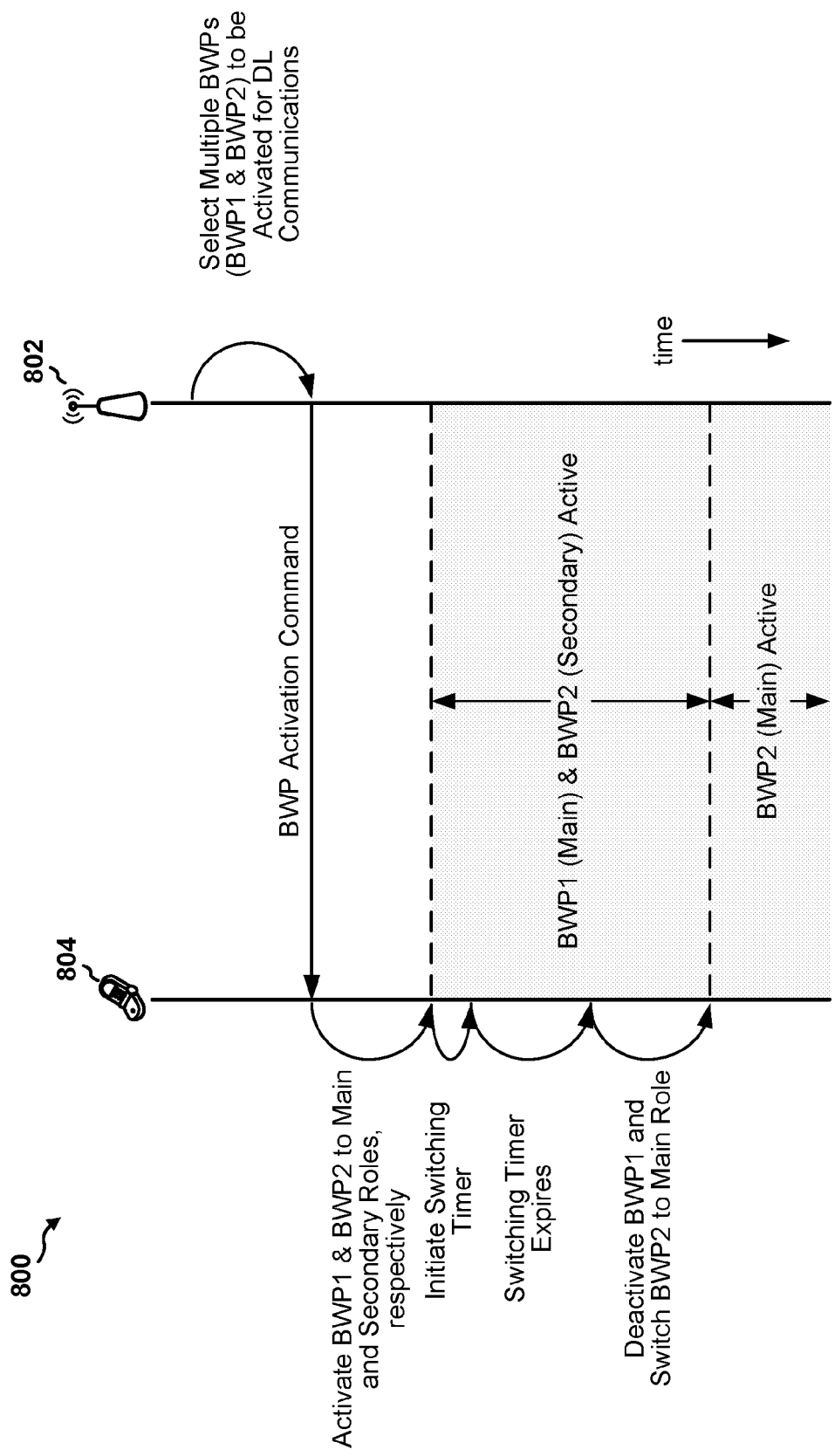
FIG. 8A shows a sequence diagram depicting example communications between a UE and a base station that support timer-based switching for multiple active BWPs in accordance with aspects of the present disclosure.

FIG. 8A shows a sequence diagram 800 depicting example communications between a UE 804 and a base station 802 that support timer-based switching for multiple active BWPs in accordance with aspects of the present disclosure. In some implementations, the base station 802 may be one example of the base station 105 of FIG. 1, the UE 804 may be one example of the UE 115 of FIG. 1, and the access network may be a 5G NR network. The base station 802 may be any suitable base station or node including, for example, a gNB or an eNB.

The base station 802 may select multiple bandwidth parts BWP1 and BWP2 to be activated for communications in a given direction (DL or UL) with the UE 804. In the example of FIG. 8A, BWP1 and BWP2 are used for DL communications. However, in some other implementations, BWP1 and BWP2 may be used for UL communications in a substantially similar manner as described herein. In some implementations, BWP1 may be used for DL communications in an HD slot and BWP2 may be used for DL communications in an FD slot (such as described with respect to FIG. 5A). In some other implementations, BWP1 and BWP2 may be used, concurrently, for downlink communications in an FD slot (such as described with respect to FIG. 5B).

The base station 802 transmits one or more BWP activation commands to the UE 804 to indicate the BWPs (BWP1 and BWP2) to be activated. The BWP activation commands may be carried in RRC messages, DCI messages, MAC CEs, or any combination thereof. The UE 804 receives the BWP activation commands from the base station 802 and activates BWP1 and BWP2 in response thereto. In some aspects, the UE 804 may activate BWP1 and BWP2 at substantially the same time. In some other aspects, the UE 804 may activate BWP1 and BWP2 at different times such that the BWPs are concurrently active for at least a given duration. In some implementations, the UE 804 may assign one of the active BWPs to a main role and the other active BWP to a secondary role. In the example of FIG. 8A, BWP1 is the main BWP and BWP2 is a secondary BWP. Accordingly, the UE 804 may monitor a PDCCH only in BWP1 (such as described with respect to FIG. 4).

In some implementations, the UE 804 may initiate a switching timer in response to activating BWP1 and BWP2. The switching timer may be configured to expire after a threshold duration elapses. In some implementations, the UE 804 may reassign the role of the main BWP responsive to the expiration of the switching timer. More specifically, the UE 804 may reassign a secondary BWP to the main role. In some aspects, the UE 804 may deactivate the BWP previously assigned to the main role. As long as the switching timer has not expired, BWP1 and BWP2 remain concurrently active for DL communications between the base station 802 and the UE 804.

Upon expiration of the switching timer, the UE 804 may deactivate BWP1 and reassign BWP2 to the main role. As a result, the UE 804 may subsequently monitor a PDCCH in BWP2 for DL communications from the base station 802. Thereafter, BWP2 is the only active BWP for DL communications between the base station 802 and the UE 804 (until the base station 802 transmits a subsequent BWP activation command to the UE 804).

Figure 8B:
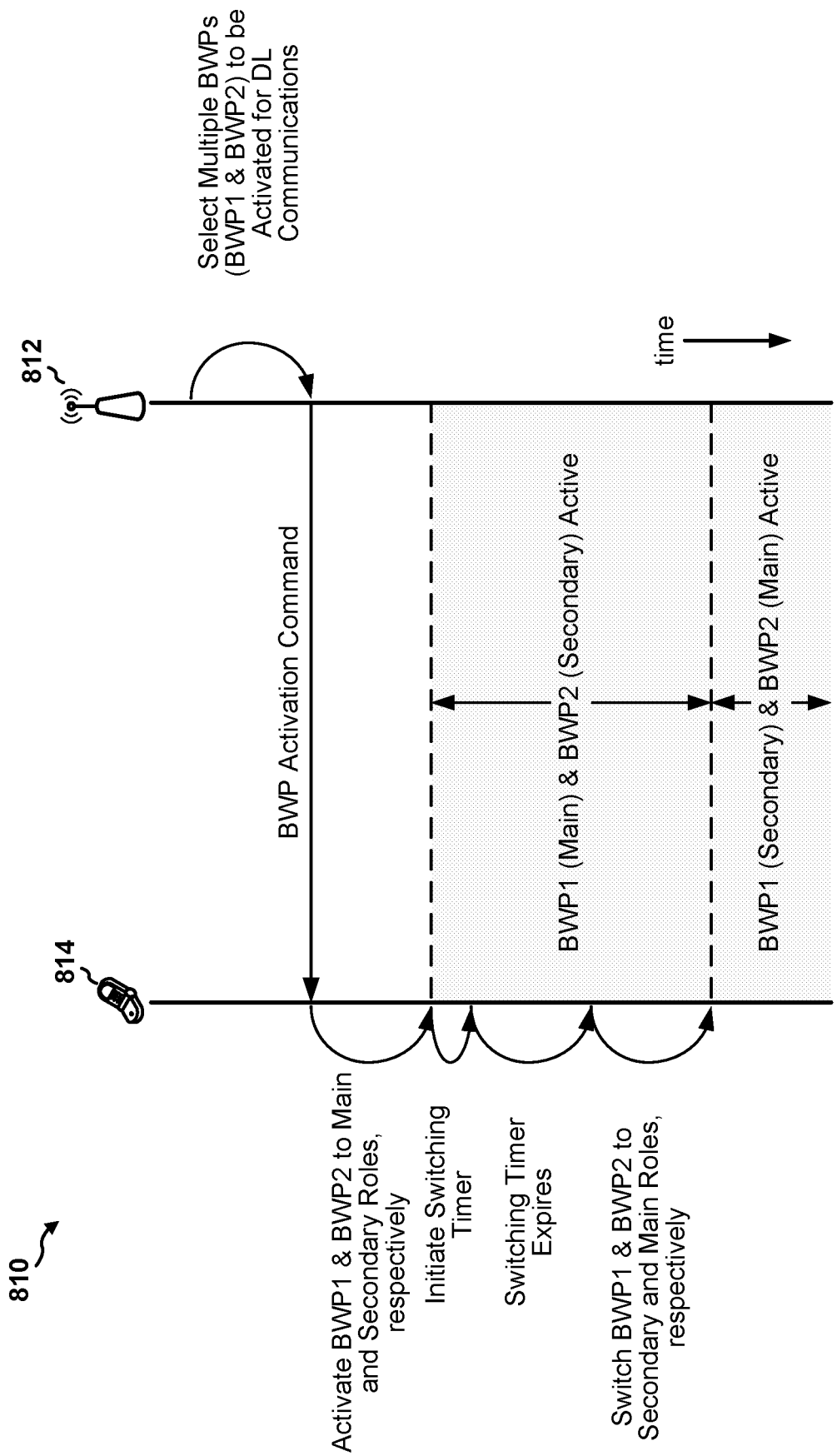
FIG. 8B shows another sequence diagram depicting example communications between a UE and a base station that support timer-based switching for multiple active BWPs in accordance with aspects of the present disclosure.

FIG. 8B shows another sequence diagram 810 depicting example communications between a UE 814 and a base station 812 that support timer-based switching for multiple active BWPs in accordance with aspects of the present disclosure. In some implementations, the base station 812 may be one example of the base station 105 of FIG. 1, the UE 814 may be one example of the UE 115 of FIG. 1, and the access network may be a 5G NR network. The base station 812 may be any suitable base station or node including, for example, a gNB or an eNB.

The base station 812 may select multiple bandwidth parts BWP1 and BWP2 to be activated for communications in a given direction (DL or UL) with the UE 814. In the example of FIG. 8B, BWP1 and BWP2 are used for DL communications. However, in some other implementations, BWP1 and BWP2 may be used for UL communications in a substantially similar manner as described herein. In some implementations, BWP1 may be used for DL communications in an HD slot and BWP2 may be used for DL communications in an FD slot (such as described with respect to FIG. 5A). In some other implementations, BWP1 and BWP2 may be used, concurrently, for downlink communications in an FD slot (such as described with respect to FIG. 5B).

The base station 812 transmits one or more BWP activation commands to the UE 814 to indicate the BWPs (BWP1 and BWP2) to be activated. The BWP activation commands may be carried in RRC messages, DCI messages, MAC CEs, or any combination thereof. The UE 814 receives the BWP activation commands from the base station 812 and activates BWP1 and BWP2 in response thereto. In some aspects, the UE 814 may activate BWP1 and BWP2 at substantially the same time. In some other aspects, the UE 814 may activate BWP1 and BWP2 at different times such that the BWPs are concurrently active for at least a given duration. In some implementations, the UE 814 may assign one of the active BWPs to a main role and the other active BWP to a secondary role. In the example of FIG. 8B, BWP1 is the main BWP and BWP2 is a secondary BWP. Accordingly, the UE 814 may monitor a PDCCH only in BWP1 (such as described with respect to FIG. 4).

In some implementations, the UE 814 may initiate a switching timer in response to activating BWP1 and BWP2. The switching timer may be configured to expire after a threshold duration elapses. In some implementations, the UE 814 may reassign the role of the main BWP responsive to the expiration of the switching timer. More specifically, the UE 814 may reassign a secondary BWP to the main role. In some aspects, the UE 814 may further reassign, to a secondary role, the BWP previously assigned to the main role.

Upon expiration of the switching timer, the UE 814 may switch the roles of BWP1 and BWP2. More specifically, BWP2 is reassigned to the main role and BWP1 is reassigned to a secondary role. As a result, the UE 814 may subsequently monitor a PDCCH in BWP2 for DL communications from the base station 812. Thereafter, BWP1 and BWP2 remain concurrently active for DL communications between the base station 812 and the UE 814 (until the base station 812 transmits a subsequent BWP activation command to the UE 814).

Figure 9A:
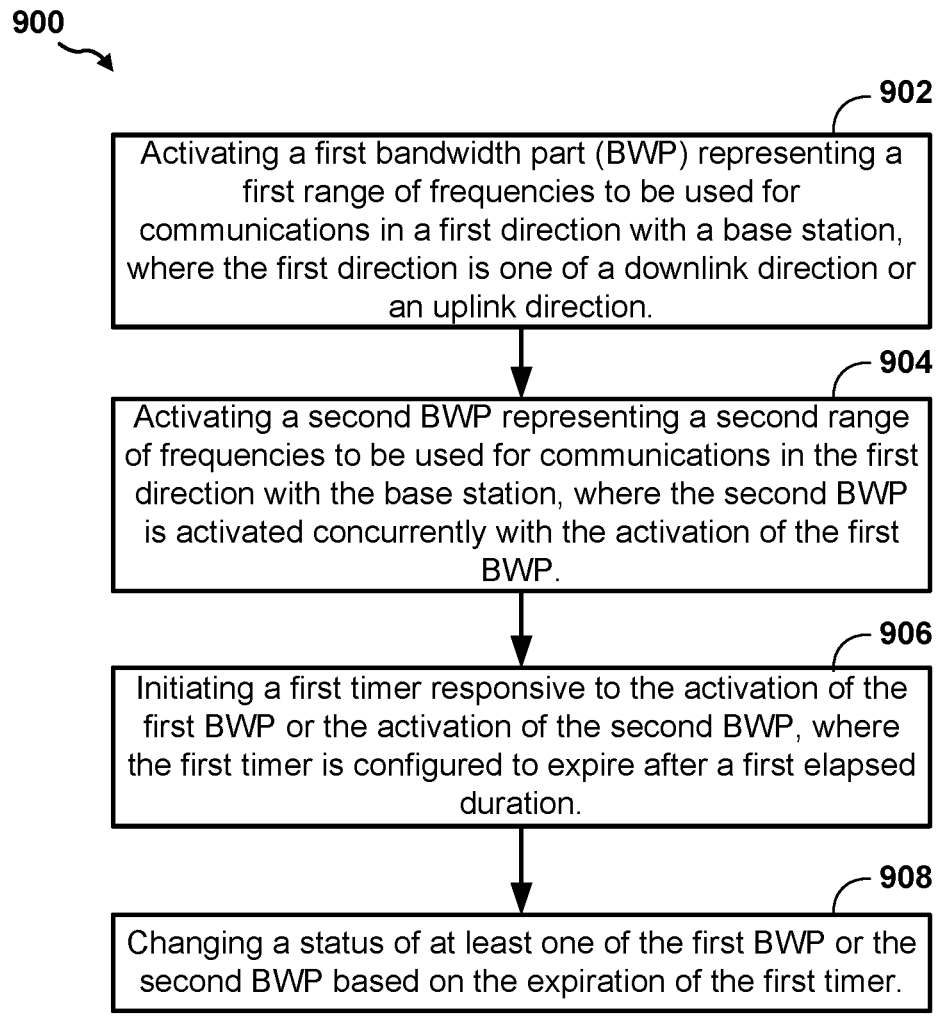
FIG. 9A shows a flowchart illustrating an example process for wireless communication that supports timer-based switching for multiple active BWPs in accordance with aspects of the present disclosure.

FIG. 9A shows a flowchart illustrating an example process 900 for wireless communication that supports timer-based switching for multiple active BWPs in accordance with aspects of the present disclosure. In some implementations, the process 900 may be performed by a wireless communication device operating as or within a UE, such as one of the UEs 115 or 350 described with respect to FIGS. 1 and 3, respectively.

In some implementations, the process 900 begins in block 902 with activating a first BWP representing a first range of frequencies to be used for communications in a first direction with a base station, where the first direction is one of a downlink direction or an uplink direction. In block 904, the process 900 proceeds with activating a second BWP representing a second range of frequencies to be used for communications in the first direction with the base station, where the second BWP is activated concurrently with the activation of the first BWP. In block 906, the process 900 proceeds with initiating a first timer responsive to the activation of the first BWP or the activation of the second BWP, where the first timer is configured to expire after a first elapsed duration. In block 908, the process 900 proceeds with changing a status of at least one of the first BWP or the second BWP based on the expiration of the first timer.

Figure 9B:
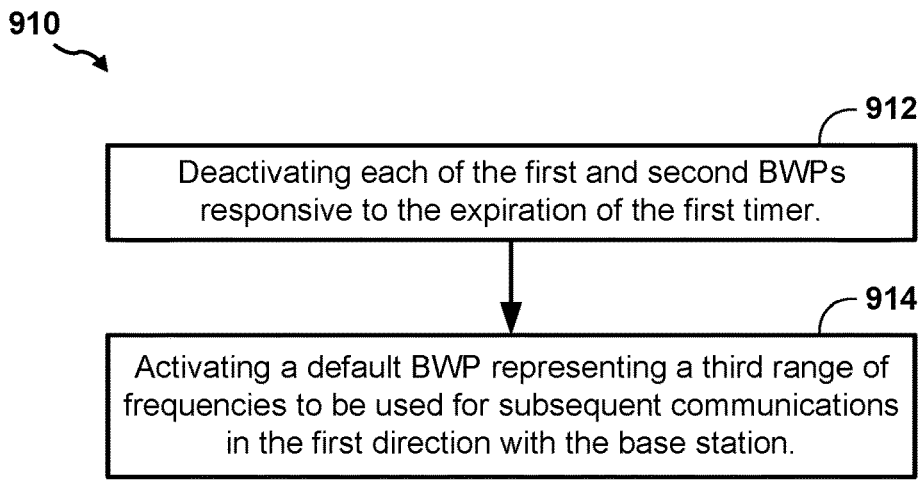
FIG. 9B shows a flowchart illustrating an example process for wireless communication that supports timer-based switching for multiple active BWPs in accordance with aspects of the present disclosure.

FIG. 9B shows a flowchart illustrating an example process 910 for wireless communication that supports timer-based switching for multiple active BWPs in accordance with aspects of the present disclosure. In some implementations, the process 910 may be performed by a wireless communication device operating as or within a UE, such as one of the UEs 115 or 350 described with respect to FIGS. 1 and 3, respectively.

With reference for example to FIG. 9A, the process 910 may be a more detailed implementation of the operation for changing the status of the first or second BWP in block 908 of the process 900. For example, the process 910 may begin after the initiation of the first timer in block 906. In some implementations, the process 910 may begin in block 912 with deactivating each of the first and second BWPs responsive to the expiration of the first timer. In block 914, the process 910 proceeds with activating a default BWP representing a third range of frequencies to be used for subsequent communications in the first direction with the base station.

Figure 9C:
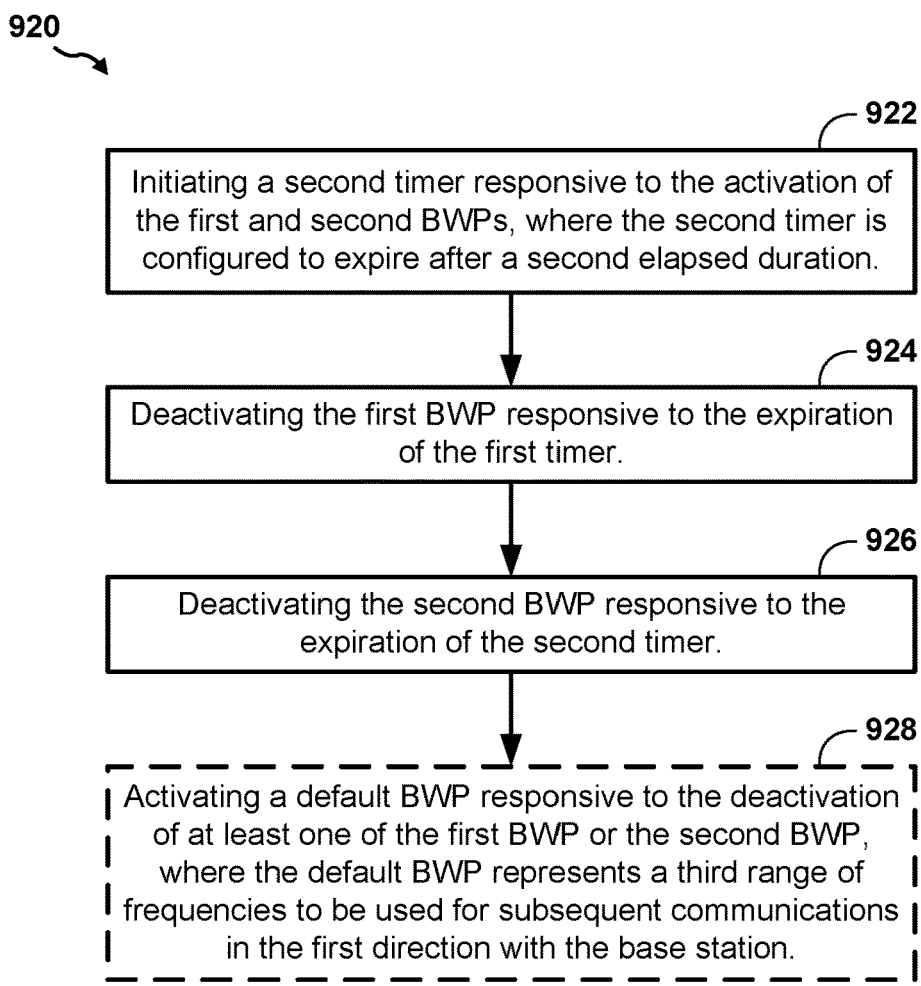
FIG. 9C shows a flowchart illustrating an example process for wireless communication that supports timer-based switching for multiple active BWPs in accordance with aspects of the present disclosure.

FIG. 9C shows a flowchart illustrating an example process 920 for wireless communication that supports timer-based switching for multiple active BWPs in accordance with aspects of the present disclosure. In some implementations, the process 920 may be performed by a wireless communication device operating as or within a UE, such as one of the UEs 115 or 350 described with respect to FIGS. 1 and 3, respectively.

With reference for example to FIG. 9A, the process 920 may be a more detailed implementation of the operation for changing the status of the first or second BWP in block 908 of the process 900. For example, the process 920 may begin after the initiation of the first timer in block 906. In some implementations, the process 920 may begin in block 922 with initiating a second timer responsive to the activation of the first and second BWPs, where the second timer is configured to expire after a second elapsed duration. In block 924, the process 920 proceeds with deactivating the first BWP responsive to the expiration of the first timer. In block 926, the process 920 proceeds with deactivating the second BWP responsive to the expiration of the second timer. In some implementations, the process 920 may proceed to block 928 with activating a default BWP responsive to the deactivation of at least one of the first BWP or the second BWP, where the default BWP represents a third range of frequencies to be used for subsequent communications in the first direction with the base station.

Figure 9D:
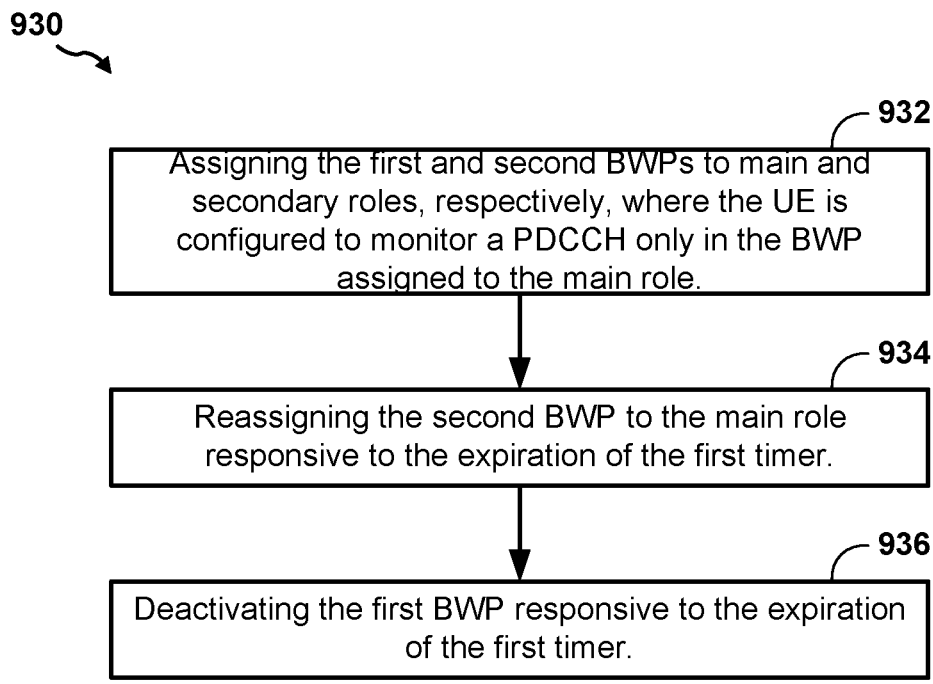
FIG. 9D shows a flowchart illustrating an example process for wireless communication that supports timer-based switching for multiple active BWPs in accordance with aspects of the present disclosure.

FIG. 9D shows a flowchart illustrating an example process 930 for wireless communication that supports timer-based switching for multiple active BWPs in accordance with aspects of the present disclosure. In some implementations, the process 930 may be performed by a wireless communication device operating as or within a UE, such as one of the UEs 115 or 350 described with respect to FIGS. 1 and 3, respectively.

With reference for example to FIG. 9A, the process 930 may be a more detailed implementation of the operation for changing the status of the first or second BWP in block 908 of the process 900. For example, the process 930 may begin after the initiation of the first timer in block 906. In some implementations, the process 930 may begin in block 932 with assigning the first and second BWPs to main and secondary roles, respectively, where the UE is configured to monitor a PDCCH only in the BWP assigned to the main role. In block 934, the process 930 proceeds with reassigning the second BWP to the main role responsive to the expiration of the first timer. In block 936, the process 930 proceeds with deactivating the first BWP responsive to the expiration of the first timer.

Figure 9E:
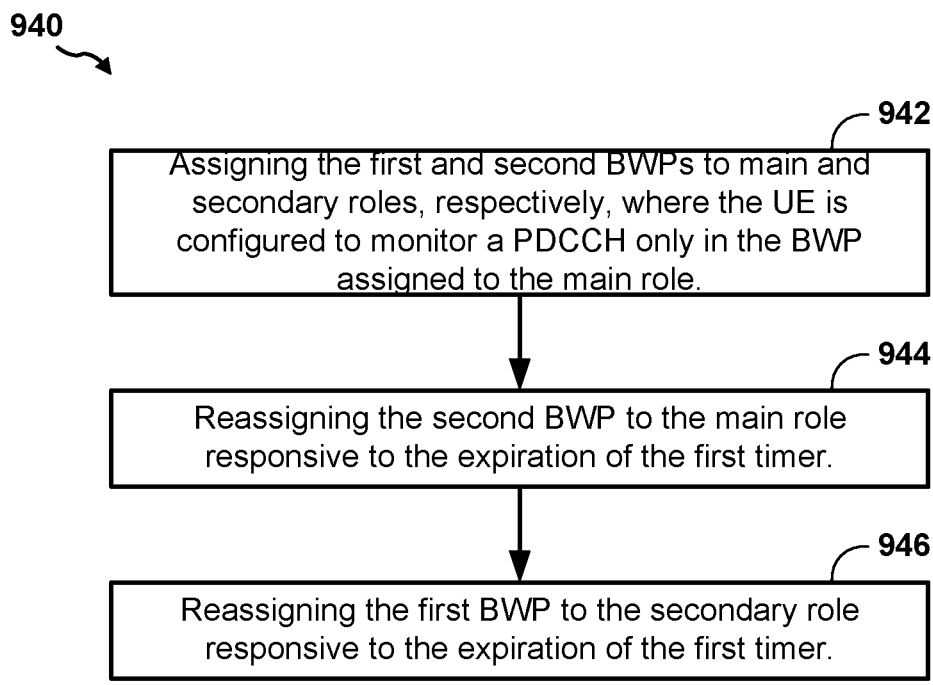
FIG. 9E shows a flowchart illustrating an example process for wireless communication that supports timer-based switching for multiple active BWPs in accordance with aspects of the present disclosure.

FIG. 9E shows a flowchart illustrating an example process 940 for wireless communication that supports timer-based switching for multiple active BWPs in accordance with aspects of the present disclosure. In some implementations, the process 940 may be performed by a wireless communication device operating as or within a UE, such as one of the UEs 115 or 350 described with respect to FIGS. 1 and 3, respectively.

With reference for example to FIG. 9A, the process 940 may be a more detailed implementation of the operation for changing the status of the first or second BWP in block 908 of the process 900. For example, the process 940 may begin after the initiation of the first timer in block 906. In some implementations, the process 940 may begin in block 942 with assigning the first and second BWPs to main and secondary roles, respectively, where the UE is configured to monitor a PDCCH only in the BWP assigned to the main role. In block 944, the process 940 proceeds with reassigning the second BWP to the main role responsive to the expiration of the first timer. In block 946, the process 940 proceeds with reassigning the first BWP to the secondary role responsive to the expiration of the first timer.

Figure 10:
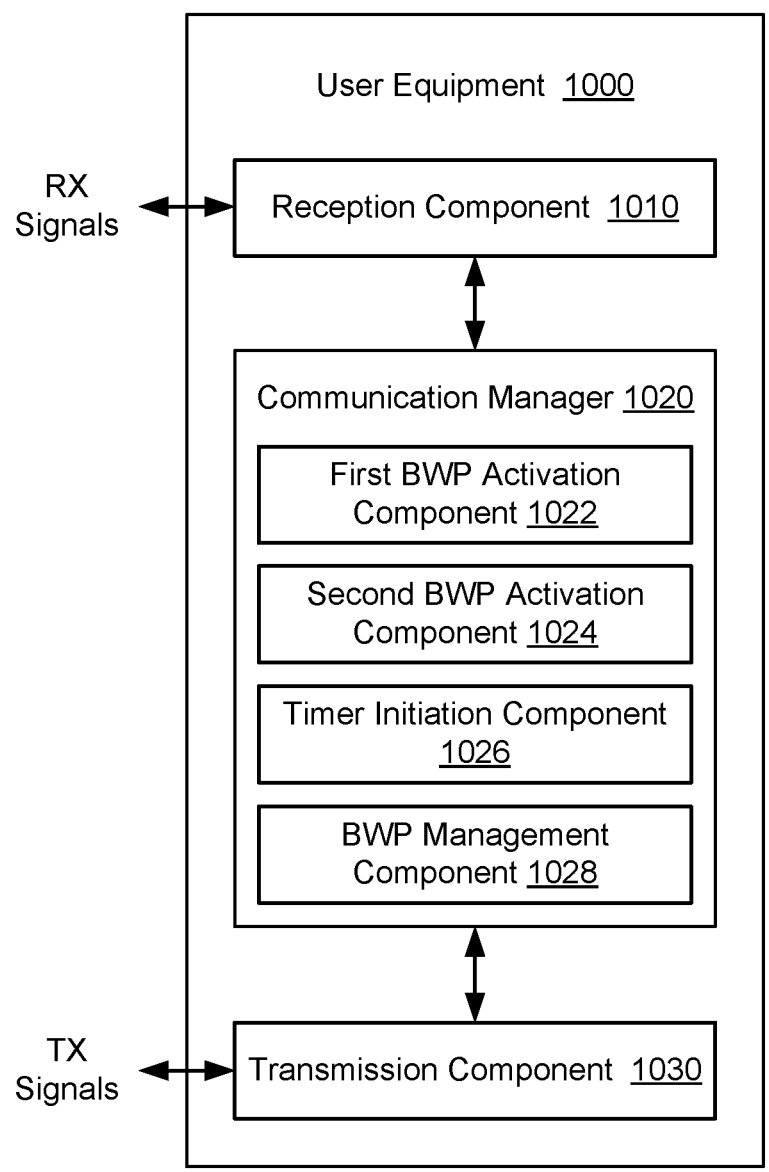
FIG. 10 shows a block diagram of an example UE that supports timer-based switching for multiple active BWPs in accordance with aspects of the present disclosure

FIG. 10 shows a block diagram of an example UE 1000 that supports timer-based switching for multiple active BWPs in accordance with aspects of the present disclosure. In some implementations, the UE 1000 is configured to perform any of the processes 900, 910, 920, 930, or 940 described above with reference to FIGS. 9A, 9B, 9C, 9D, and 9E, respectively. The UE 1000 can be an example implementation of the UE 350 described above with reference to FIG. 3. For example, the UE 1000 can be a chip, SoC, chipset, package or device that includes at least one processor and at least one modem (for example, a Wi-Fi (IEEE 802.11) modem or a cellular modem).

The UE 1000 includes a reception component 1010, a communication manager 1020, and a transmission component 1030. The communication manager 1020 further includes a first BWP activation component 1022, a second BWP activation component 1024, a timer initiation component 1026, and a BWP management component 1028. Portions of one or more of the components 1022-1028 may be implemented at least in part in hardware or firmware. In some implementations, at least some of the components 1022, 1024, 1026, or 1028 are implemented at least in part as software stored in a memory (such as the memory 360). For example, portions of one or more of the components 1022, 1024, 1026, and 1028 can be implemented as non-transitory instructions (or "code") executable by a processor (such as the controller/processor 359) to perform the functions or operations of the respective component.

The reception component 1010 is configured to receive RX signals representing DL communications from a base station. The transmission component 1030 is configured to transmit TX signals representing UL communications to the base station. The communication manager 1020 is configured to control or manage DL and UL communications with the base station. In some implementations, the first BWP activation component 1022 may activate a first BWP representing a first range of frequencies to be used for communications in a first direction with a base station, where the first direction is a DL direction or a UL direction; the second BWP activation component 1024 may activate a second BWP representing a second range of frequencies to be used for communications in the first direction with the base station, where the second BWP is activated concurrently with the activation of the first BWP; the timer initiation component 1026 may initiate a first timer responsive to the activation of the first BWP or the activation of the second BWP, where the first timer is configured to expire after a first elapsed duration; and the BWP management component 1028 may change a status of at least one of the first BWP or the second BWP based on the expiration of the first timer.

Figure 11:
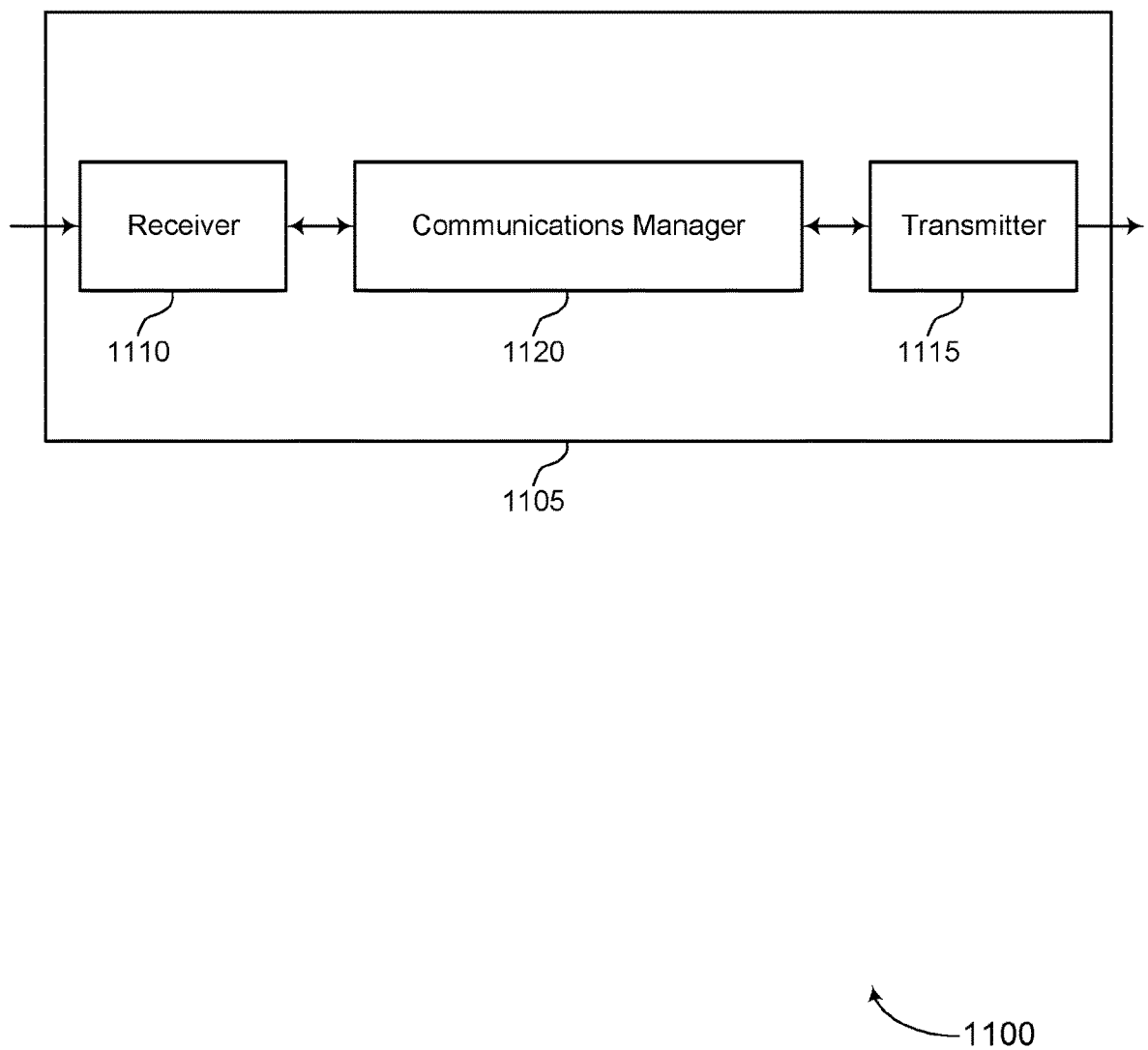
FIGS. 11 and 12 show block diagrams of devices that support timer-based switching for multiple active BWPs in accordance with aspects of the present disclosure.

FIG. 11 shows a block diagram of a device 1105 that supports timer-based switching for multiple active BWPs in accordance with aspects of the present disclosure. The device 1105 may be an example of aspects of a UE 115 as described herein. The device 1105 may include a receiver 1110, a transmitter 1115, and a communications manager 1120. The communications manager 1120 can be implemented, at least in part, by one or both of a modem and a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to timer-based switching for multiple active BWPs). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to timer-based switching for multiple active BWPs). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of timer-based switching for multiple active BWPs as described herein. For example, the communications manager 1120, the receiver 1110, the transmitter 1115, or various combinations or components thereof may support a method for performing one or more of the functions described herein.

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

For example, the communications manager 1120 may be configured as or otherwise support a means for activating a first BWP representing a first range of frequencies to be used for communications in a first direction with a base station, the first direction being one of a downlink direction or an uplink direction. The communications manager 1120 may be configured as or otherwise support a means for activating a second BWP representing a second range of frequencies to be used for communications in the first direction with the base station, the second BWP being active concurrently with the first BWP. The communications manager 1120 may be configured as or otherwise support a means for initiating a first timer responsive to the activation of the first BWP or the activation of the second BWP, the first timer being configured to expire after a first elapsed duration. The communications manager 1120 may be configured as or otherwise support a means for changing a status of at least one of the first BWP or the second BWP based on the expiration of the first timer.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for maintaining multiple active BWPs, resulting in the UE mitigating a switching time associated with switching from FD to HD communications, reducing processing power, decreasing latency, among other examples.

Figure 12:
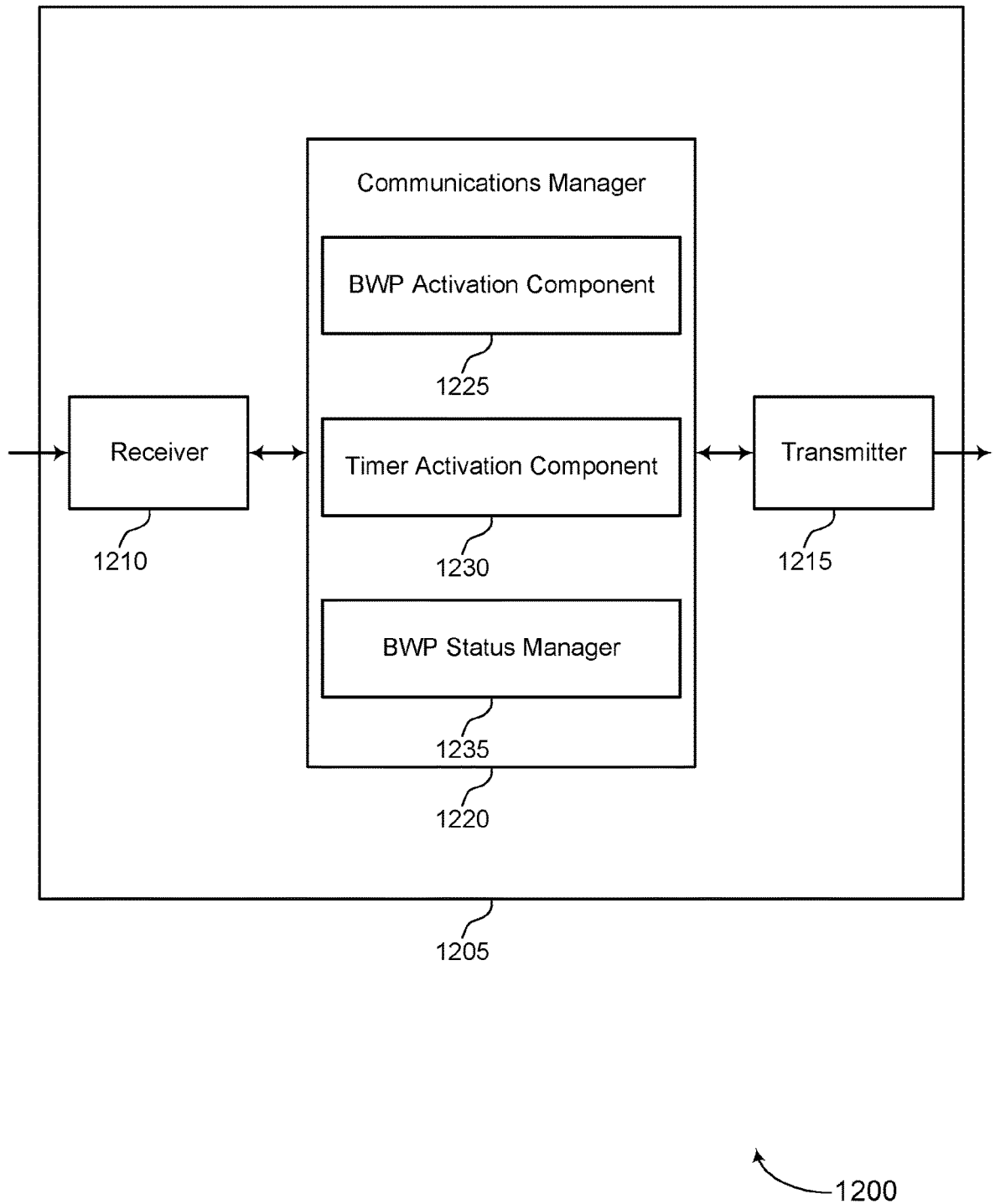

FIG. 12 shows a block diagram of a device 1205 that supports timer-based switching for multiple active BWPs in accordance with aspects of the present disclosure. The device 1205 may be an example of aspects of a device 1105 or a UE 115 as described herein. The device 1205 may include a receiver 1210, a transmitter 1215, and a communications manager 1220. The communications manager 1220 can be implemented, at least in part, by one or both of a modem and a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to timer-based switching for multiple active BWPs). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to timer-based switching for multiple active BWPs). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of timer-based switching for multiple active BWPs as described herein. For example, the communications manager 1220 may include a BWP activation component 1225, a timer activation component 1230, a BWP status manager 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The BWP activation component 1225 may be configured as or otherwise support a means for activating a first BWP representing a first range of frequencies to be used for communications in a first direction with a base station, the first direction being one of a downlink direction or an uplink direction. The BWP activation component 1225 may be configured as or otherwise support a means for activating a second BWP representing a second range of frequencies to be used for communications in the first direction with the base station, the second BWP being active concurrently with the first BWP. The timer activation component 1230 may be configured as or otherwise support a means for initiating a first timer responsive to the activation of the first BWP or the activation of the second BWP, the first timer being configured to expire after a first elapsed duration. The BWP status manager 1235 may be configured as or otherwise support a means for changing a status of at least one of the first BWP or the second BWP based on the expiration of the first timer.

Figure 13:
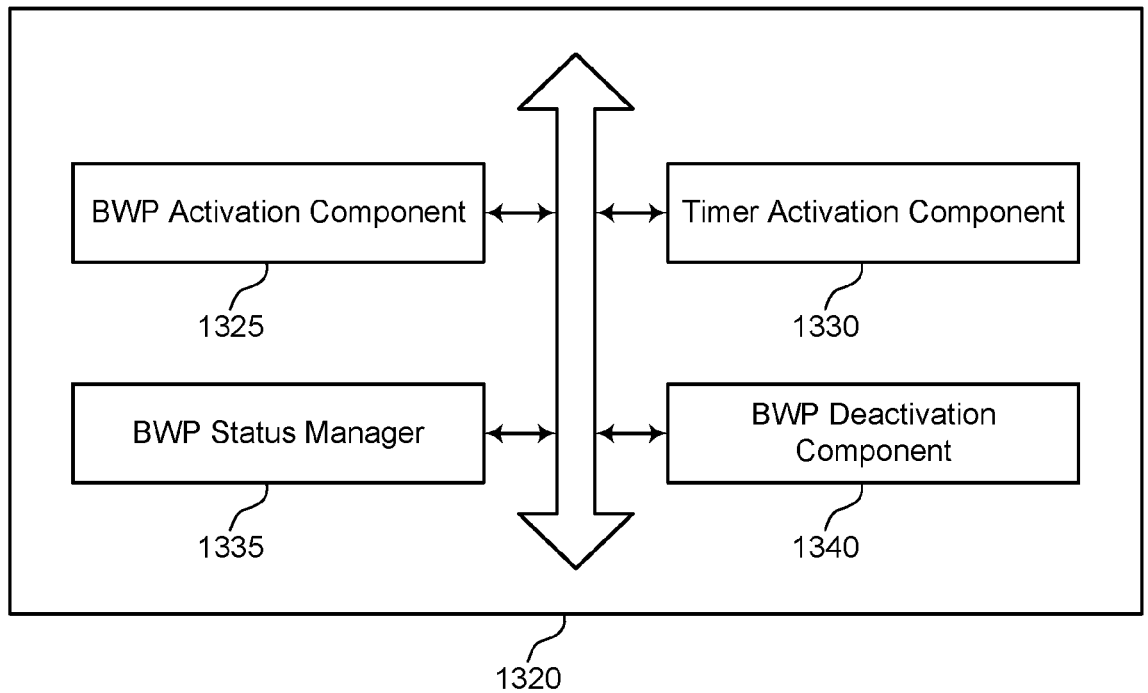
FIG. 13 shows a block diagram of a communications manager that supports timer-based switching for multiple active BWPs in accordance with aspects of the present disclosure.

FIG. 13 shows a block diagram of a communications manager 1320 that supports timer-based switching for multiple active BWPs in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of timer-based switching for multiple active BWPs as described herein. For example, the communications manager 1320 may include a BWP activation component 1325, a timer activation component 1330, a BWP status manager 1335, a BWP deactivation component 1340, or any combination thereof. Each of these components may communicate, directly or indirectly, with one another (e.g., via one or more buses).

The BWP activation component 1325 may be configured as or otherwise support a means for activating a first BWP representing a first range of frequencies to be used for communications in a first direction with a base station, the first direction being one of a downlink direction or an uplink direction. In some examples, the BWP activation component 1325 may be configured as or otherwise support a means for activating a second BWP representing a second range of frequencies to be used for communications in the first direction with the base station, the second BWP being active concurrently with the first BWP. The timer activation component 1330 may be configured as or otherwise support a means for initiating a first timer responsive to the activation of the first BWP or the activation of the second BWP, the first timer being configured to expire after a first elapsed duration. The BWP status manager 1335 may be configured as or otherwise support a means for changing a status of at least one of the first BWP or the second BWP based on the expiration of the first timer.

In some examples, to support changing of the status of the at least one of the first BWP or the second BWP, the BWP deactivation component 1340 may be configured as or otherwise support a means for deactivating each of the first and second BWPs responsive to the expiration of the first timer. In some examples, to support changing of the status of the at least one of the first BWP or the second BWP, the BWP deactivation component 1340 may be configured as or otherwise support a means for activating a default BWP representing a third range of frequencies to be used for subsequent communications in the first direction with the base station. In some examples, the third range of frequencies is narrower than each of the first and second ranges of frequencies.

In some examples, the timer activation component 1330 may be configured as or otherwise support a means for initiating a second timer responsive to the activation of the first and second BWPs, the second timer being configured to expire after a second elapsed duration.

In some examples, to support changing of the status of the at least one of the first BWP or the second BWP, the BWP deactivation component 1340 may be configured as or otherwise support a means for deactivating the first BWP responsive to the expiration of the first timer. In some examples, to support changing of the status of the at least one of the first BWP or the second BWP, the BWP deactivation component 1340 may be configured as or otherwise support a means for deactivating the second BWP responsive to the expiration of the second timer.

In some examples, the first timer expires prior to the expiration of the second timer, the second BWP remaining active after the expiration of the first timer. In some examples, the second timer expires prior to the expiration of the first timer, the first BWP remaining active after the expiration of the second timer.

In some examples, to support changing of the status of the at least one of the first BWP or the second BWP, the BWP activation component 1325 may be configured as or otherwise support a means for activating a default BWP responsive to the deactivation of at least one of the first BWP or the second BWP, the default BWP representing a third range of frequencies to be used for subsequent communications in the first direction with the base station.

In some examples, the third range of frequencies is narrower than each of the first and second ranges of frequencies. In some examples, the first timer expires prior to the expiration of the second timer, the second BWP and the default BWP being concurrently active after the expiration of the first timer.

In some examples, the second timer expires prior to the expiration of the first timer, the first BWP and the default BWP being concurrently active after the expiration of the second timer. In some examples, the default BWP is the only active BWP after the expirations of the first and second timers. In some examples, the UE is configured to monitor a PDCCH in each active BWP.

In some examples, the BWP status manager 1335 may be configured as or otherwise support a means for assigning the first and second BWPs to main and secondary roles, respectively, the UE being configured to monitor a PDCCH only in the BWP assigned to the main role.

In some examples, to support changing of the status of the at least one of the first BWP or the second BWP, the BWP status manager 1335 may be configured as or otherwise support a means for reassigning the second BWP to the main role responsive to the expiration of the first timer.

In some examples, to support changing of the status of the at least one of the first BWP or the second BWP, the BWP deactivation component 1340 may be configured as or otherwise support a means for deactivating the first BWP responsive to the expiration of the first timer.

In some examples, to support changing of the status of the at least one of the first BWP or the second BWP, the BWP status manager 1335 may be configured as or otherwise support a means for reassigning the first BWP to the secondary role responsive to the expiration of the first timer.

In some examples, the second range of frequencies is narrower than the first range of frequencies. In some examples, the first range of frequencies overlaps the second range of frequencies. In some examples, the first range of frequencies does not overlap the second range of frequencies.

Figure 14:
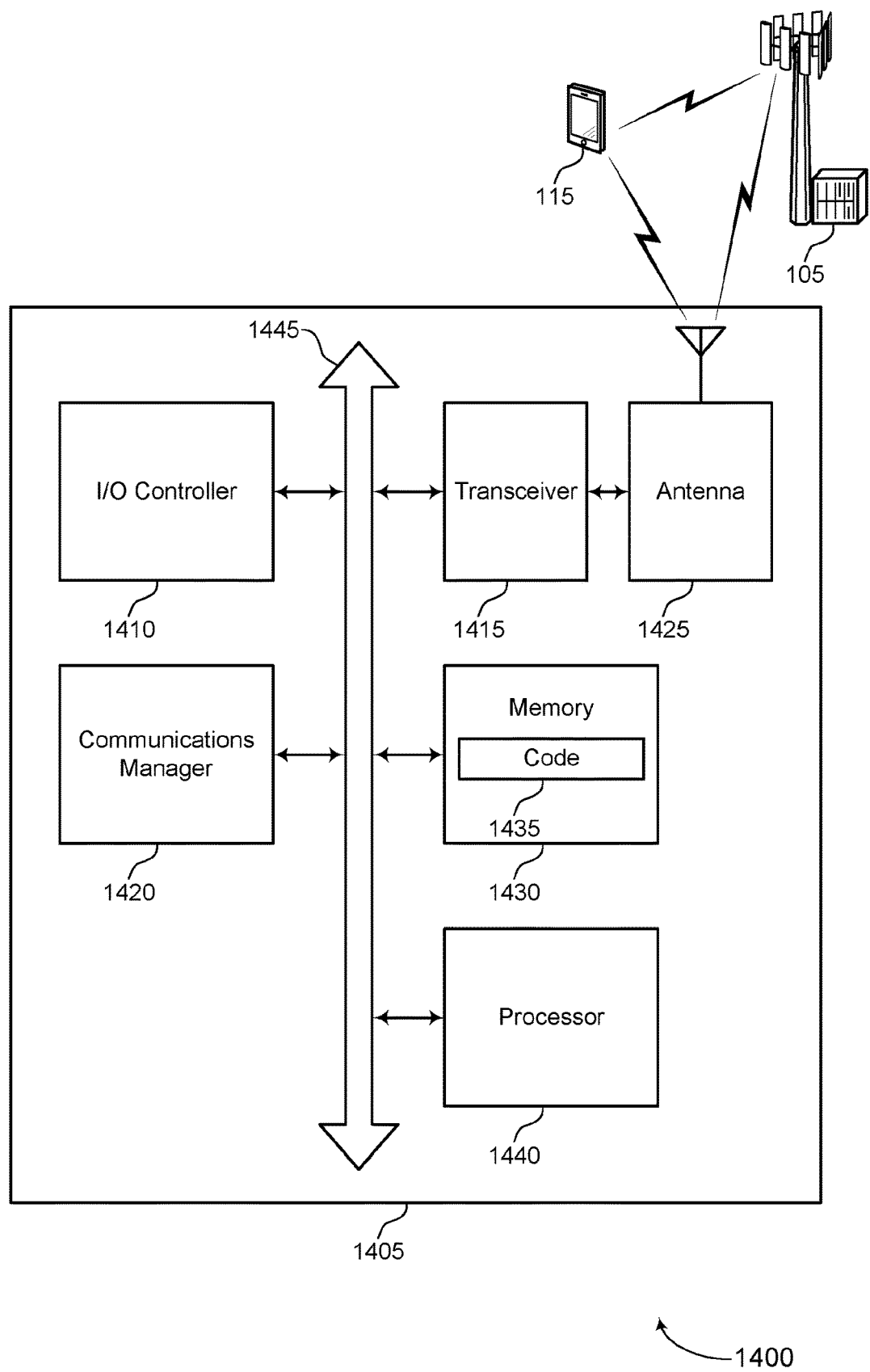
FIG. 14 shows a diagram of a system including a device that supports timer-based switching for multiple active BWPs in accordance with aspects of the present disclosure.

FIG. 14 shows a diagram of a system 1400 including a device 1405 that supports timer-based switching for multiple active BWPs in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting timer-based switching for multiple active BWPs). For example, the device 1405 or a component of the device 1405 may include a processor 1440 and memory 1430 coupled to the processor 1440, the processor 1440 and memory 1430 configured to perform various functions described herein.

For example, the communications manager 1420 may be configured as or otherwise support a means for activating a first BWP representing a first range of frequencies to be used for communications in a first direction with a base station, the first direction being one of a downlink direction or an uplink direction. The communications manager 1420 may be configured as or otherwise support a means for activating a second BWP representing a second range of frequencies to be used for communications in the first direction with the base station, the second BWP being active concurrently with the first BWP. The communications manager 1420 may be configured as or otherwise support a means for initiating a first timer responsive to the activation of the first BWP or the activation of the second BWP, the first timer being configured to expire after a first elapsed duration. The communications manager 1420 may be configured as or otherwise support a means for changing a status of at least one of the first BWP or the second BWP based on the expiration of the first timer.

By including or configuring the communications manager 1420 in accordance with examples as described herein, the device 1405 may support techniques for maintaining multiple active BWPs, resulting in the UE mitigating a switching time associated with switching from FD to HD communications, improving communication reliability, reduced latency, reduced power consumption, more efficient utilization of communication resources, improved coordination between devices, longer battery life, among other examples.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of timer-based switching for multiple active BWPs as described herein, or the processor 1440 and the memory 1430 may be otherwise configured to perform or support such operations.

Figure 15:
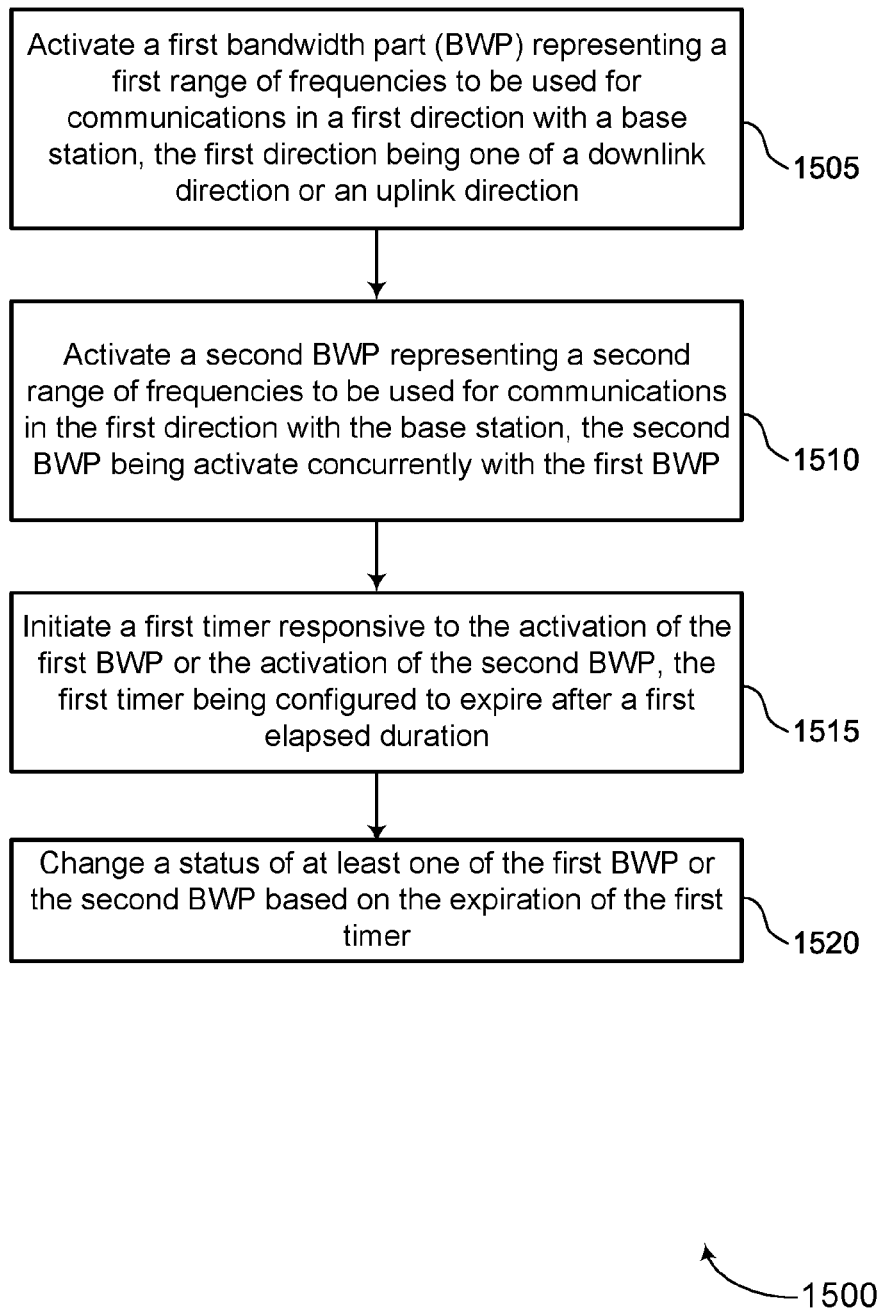
FIGS. 15-19 show flowcharts illustrating methods that support timer-based switching for multiple active BWPs in accordance with aspects of the present disclosure.

FIG. 15 shows a flowchart illustrating a method 1500 that supports timer-based switching for multiple active BWPs in accordance with aspects of the present disclosure. The operations of the method 1500 may be implemented by a UE or its components as described herein. For example, the operations of the method 1500 may be performed by a UE 115 as described with reference to FIGS. 1-14. In some examples, a UE may execute a set of instructions to control the functional elements of the UE to perform the described functions. Additionally, or alternatively, the UE may perform aspects of the described functions using special-purpose hardware.

At 1505, the method may include activating a first BWP representing a first range of frequencies to be used for communications in a first direction with a base station, the first direction being one of a downlink direction or an uplink direction. The operations of 1505 may be performed in accordance with examples as disclosed herein. In some examples, aspects of the operations of 1505 may be performed by a BWP activation component 1325 as described with reference to FIG. 13.

At 1510, the method may include activating a second BWP representing a second range of frequencies to be used for communications in the first direction with the base station, the second BWP being active concurrently with the first BWP. The operations of 1510 may be performed in accordance with examples as disclosed herein. In some examples, aspects of the operations of 1510 may be performed by a BWP activation component 1325 as described with reference to FIG. 13.

At 1515, the method may include initiating a first timer responsive to the activation of the first BWP or the activation of the second BWP, the first timer being configured to expire after a first elapsed duration. The operations of 1515 may be performed in accordance with examples as disclosed herein. In some examples, aspects of the operations of 1515 may be performed by a timer activation component 1330 as described with reference to FIG. 13.

At 1520, the method may include changing a status of at least one of the first BWP or the second BWP based on the expiration of the first timer. The operations of 1520 may be performed in accordance with examples as disclosed herein. In some examples, aspects of the operations of 1520 may be performed by a BWP status manager 1335 as described with reference to FIG. 13.

Figure 16:
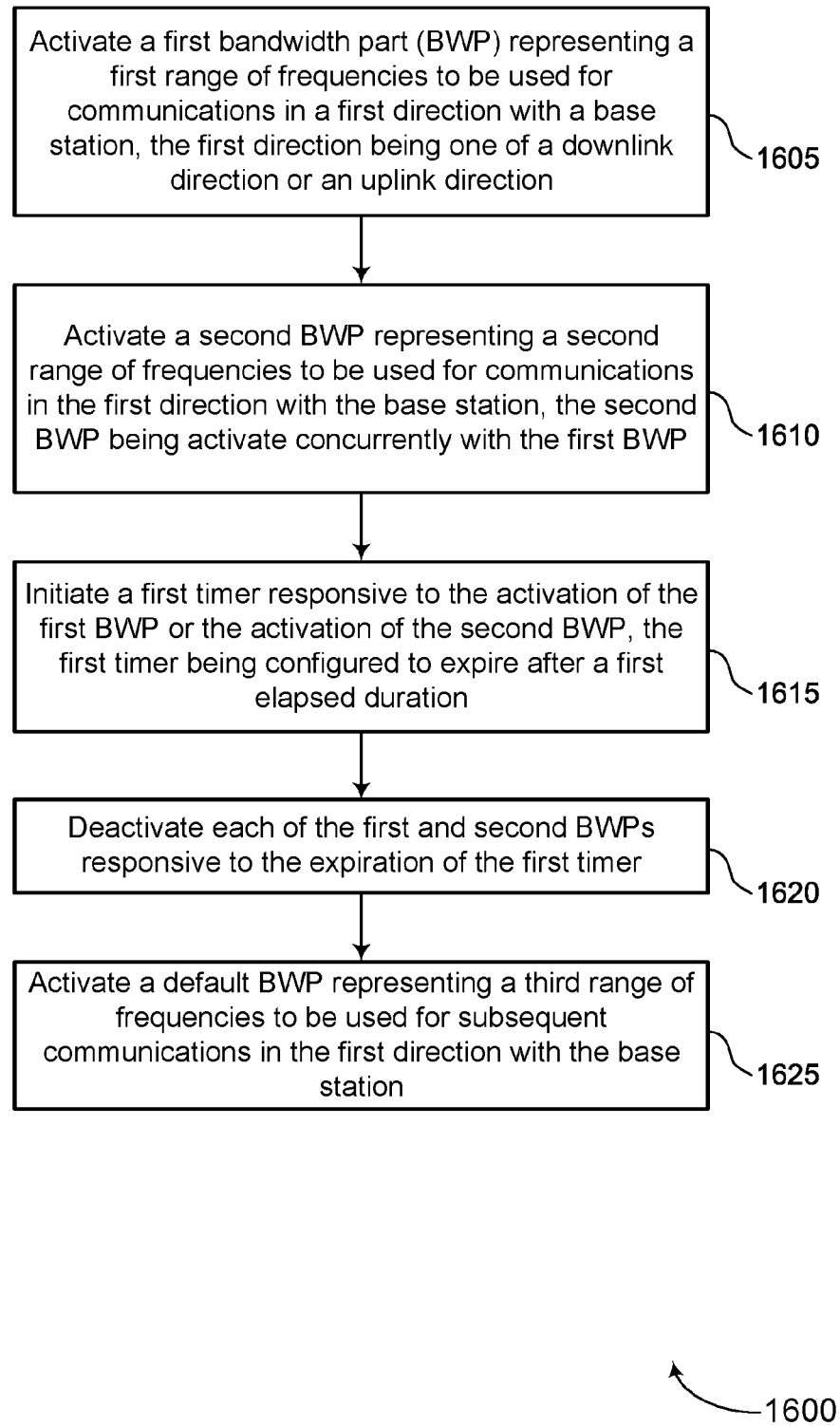

FIG. 16 shows a flowchart illustrating a method 1600 that supports timer-based switching for multiple active BWPs in accordance with aspects of the present disclosure. The operations of the method 1600 may be implemented by a UE or its components as described herein. For example, the operations of the method 1600 may be performed by a UE 115 as described with reference to FIGS. 1-14. In some examples, a UE may execute a set of instructions to control the functional elements of the UE to perform the described functions. Additionally, or alternatively, the UE may perform aspects of the described functions using special-purpose hardware.

At 1605, the method may include activating a first BWP representing a first range of frequencies to be used for communications in a first direction with a base station, the first direction being one of a downlink direction or an uplink direction. The operations of 1605 may be performed in accordance with examples as disclosed herein. In some examples, aspects of the operations of 1605 may be performed by a BWP activation component 1325 as described with reference to FIG. 13.

At 1610, the method may include activating a second BWP representing a second range of frequencies to be used for communications in the first direction with the base station, the second BWP being active concurrently with the first BWP. The operations of 1610 may be performed in accordance with examples as disclosed herein. In some examples, aspects of the operations of 1610 may be performed by a BWP activation component 1325 as described with reference to FIG. 13.

At 1615, the method may include initiating a first timer responsive to the activation of the first BWP or the activation of the second BWP, the first timer being configured to expire after a first elapsed duration. The operations of 1615 may be performed in accordance with examples as disclosed herein. In some examples, aspects of the operations of 1615 may be performed by a timer activation component 1330 as described with reference to FIG. 13.

At 1620, the method may include deactivating each of the first and second BWPs responsive to the expiration of the first timer. The operations of 1620 may be performed in accordance with examples as disclosed herein. In some examples, aspects of the operations of 1620 may be performed by a BWP deactivation component 1340 as described with reference to FIG. 13.

At 1625, the method may include activating a default BWP representing a third range of frequencies to be used for subsequent communications in the first direction with the base station. The operations of 1625 may be performed in accordance with examples as disclosed herein. In some examples, aspects of the operations of 1625 may be performed by a BWP deactivation component 1340 as described with reference to FIG. 13.

Figure 17:
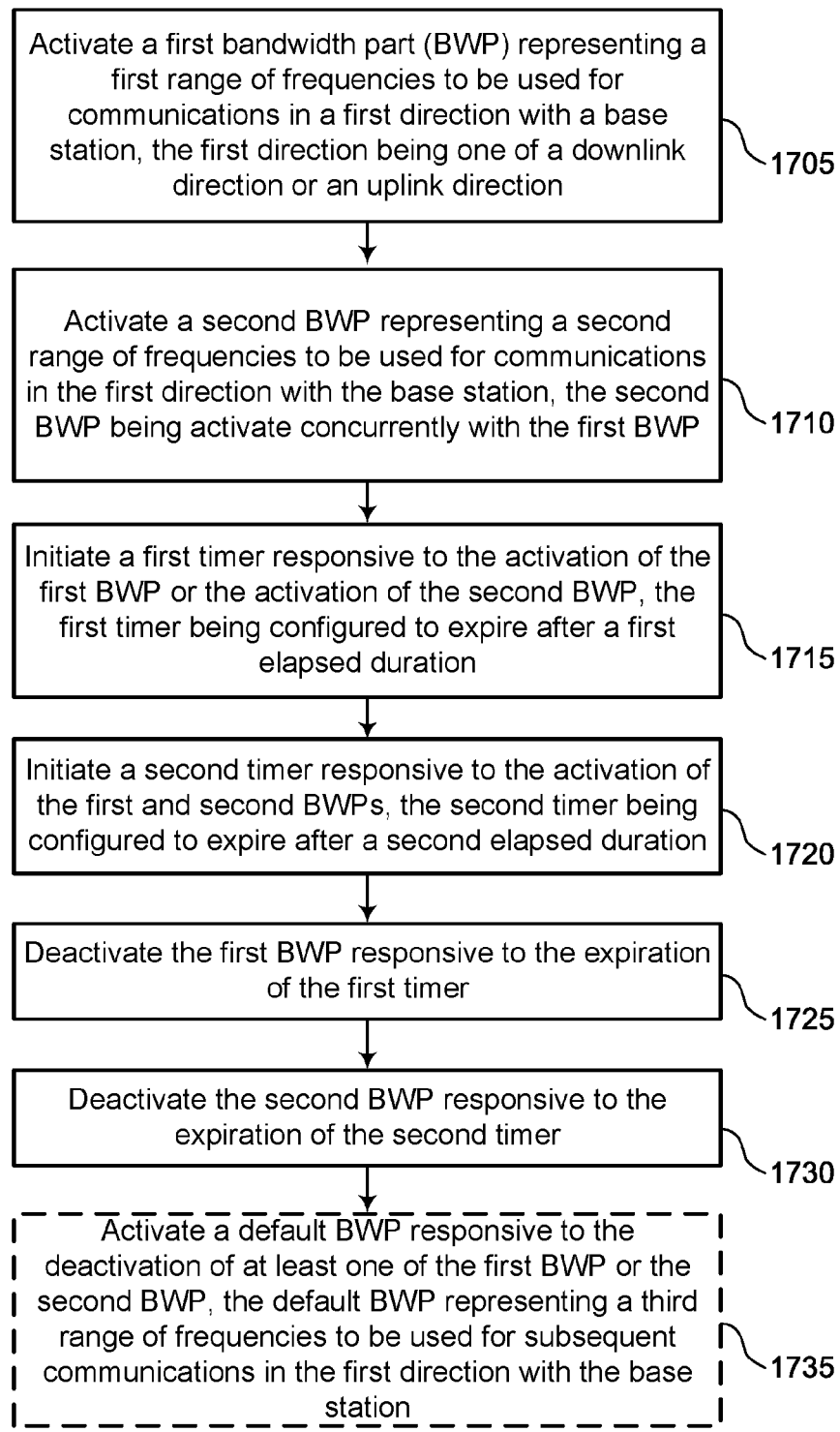

FIG. 17 shows a flowchart illustrating a method 1700 that supports timer-based switching for multiple active BWPs in accordance with aspects of the present disclosure. The operations of the method 1700 may be implemented by a UE or its components as described herein. For example, the operations of the method 1700 may be performed by a UE 115 as described with reference to FIGS. 1-14. In some examples, a UE may execute a set of instructions to control the functional elements of the UE to perform the described functions. Additionally, or alternatively, the UE may perform aspects of the described functions using special-purpose hardware.

At 1705, the method may include activating a first BWP representing a first range of frequencies to be used for communications in a first direction with a base station, the first direction being one of a downlink direction or an uplink direction. The operations of 1705 may be performed in accordance with examples as disclosed herein. In some examples, aspects of the operations of 1705 may be performed by a BWP activation component 1325 as described with reference to FIG. 13.

At 1710, the method may include activating a second BWP representing a second range of frequencies to be used for communications in the first direction with the base station, the second BWP being active concurrently with the first BWP. The operations of 1710 may be performed in accordance with examples as disclosed herein. In some examples, aspects of the operations of 1710 may be performed by a BWP activation component 1325 as described with reference to FIG. 13.

At 1715, the method may include initiating a first timer responsive to the activation of the first BWP or the activation of the second BWP, the first timer being configured to expire after a first elapsed duration. The operations of 1715 may be performed in accordance with examples as disclosed herein. In some examples, aspects of the operations of 1715 may be performed by a timer activation component 1330 as described with reference to FIG. 13.

At 1720, the method may include initiating a second timer responsive to the activation of the first and second BWPs, the second timer being configured to expire after a second elapsed duration. The operations of 1720 may be performed in accordance with examples as disclosed herein. In some examples, aspects of the operations of 1720 may be performed by a timer activation component 1330 as described with reference to FIG. 13.

At 1725, the method may include deactivating the first BWP responsive to the expiration of the first timer. The operations of 1725 may be performed in accordance with examples as disclosed herein. In some examples, aspects of the operations of 1725 may be performed by a BWP deactivation component 1340 as described with reference to FIG. 13.

At 1730, the method may include deactivating the second BWP responsive to the expiration of the second timer. The operations of 1730 may be performed in accordance with examples as disclosed herein. In some examples, aspects of the operations of 1730 may be performed by a BWP deactivation component 1340 as described with reference to FIG. 13.

In some examples, at 1735, the method may include activating a default BWP responsive to the deactivation of at least one of the first BWP or the second BWP, the default BWP representing a third range of frequencies to be used for subsequent communications in the first direction with the base station. The operations of 1735 may be performed in accordance with examples as disclosed herein. In some examples, aspects of the operations of 1735 may be performed by a BWP activation component 1325 as described with reference to FIG. 13.

Figure 18:
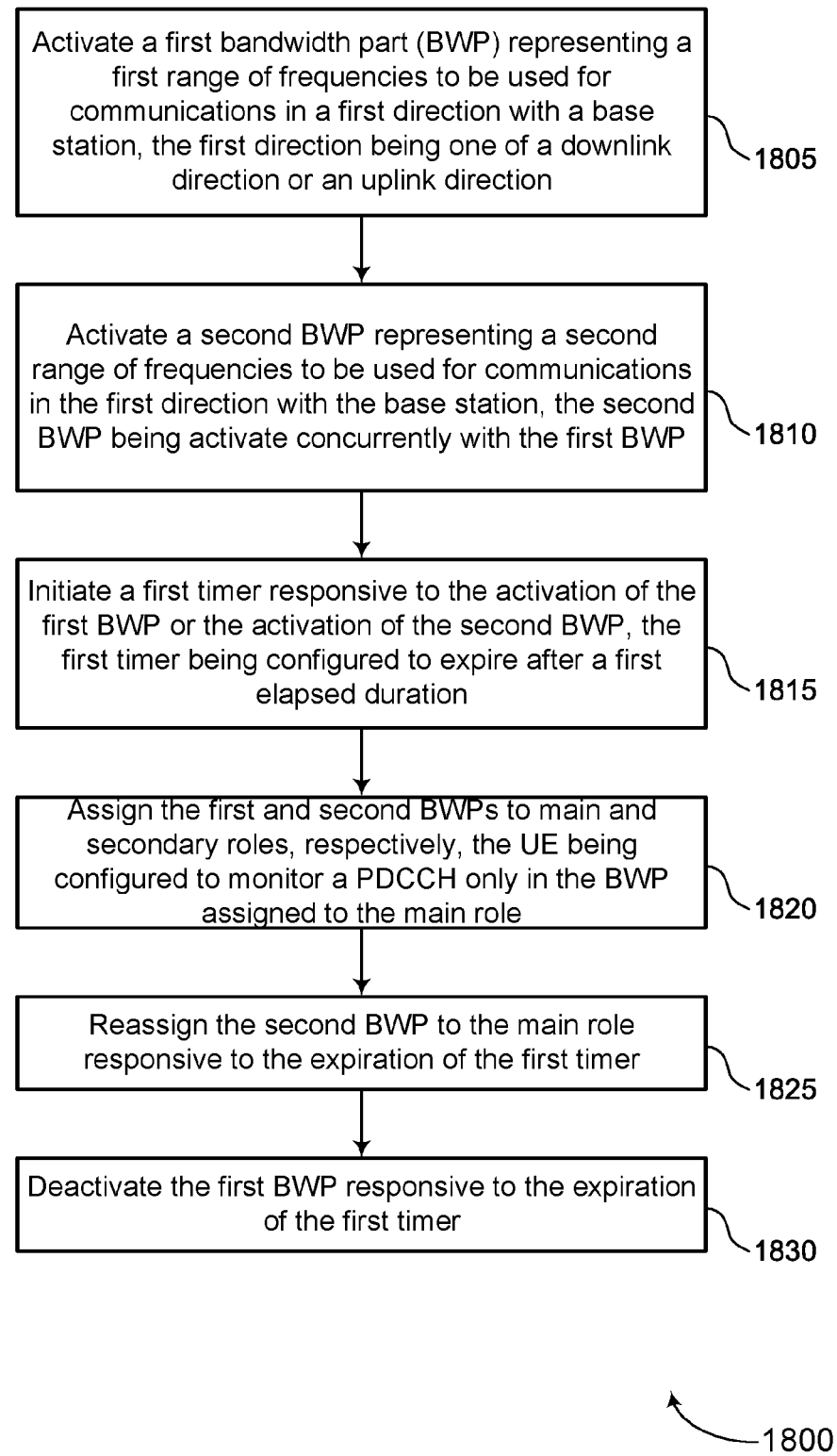

FIG. 18 shows a flowchart illustrating a method 1800 that supports timer-based switching for multiple active BWPs in accordance with aspects of the present disclosure. The operations of the method 1800 may be implemented by a UE or its components as described herein. For example, the operations of the method 1800 may be performed by a UE 115 as described with reference to FIGS. 1-14. In some examples, a UE may execute a set of instructions to control the functional elements of the UE to perform the described functions. Additionally, or alternatively, the UE may perform aspects of the described functions using special-purpose hardware.

At 1805, the method may include activating a first BWP representing a first range of frequencies to be used for communications in a first direction with a base station, the first direction being one of a downlink direction or an uplink direction. The operations of 1805 may be performed in accordance with examples as disclosed herein. In some examples, aspects of the operations of 1805 may be performed by a BWP activation component 1325 as described with reference to FIG. 13.

At 1810, the method may include activating a second BWP representing a second range of frequencies to be used for communications in the first direction with the base station, the second BWP being active concurrently with the first BWP. The operations of 1810 may be performed in accordance with examples as disclosed herein. In some examples, aspects of the operations of 1810 may be performed by a BWP activation component 1325 as described with reference to FIG. 13.

At 1815, the method may include initiating a first timer responsive to the activation of the first BWP or the activation of the second BWP, the first timer being configured to expire after a first elapsed duration. The operations of 1815 may be performed in accordance with examples as disclosed herein. In some examples, aspects of the operations of 1815 may be performed by a timer activation component 1330 as described with reference to FIG. 13.

At 1820, the method may include assigning the first and second BWPs to main and secondary roles, respectively, the UE being configured to monitor a PDCCH only in the BWP assigned to the main role. The operations of 1820 may be performed in accordance with examples as disclosed herein. In some examples, aspects of the operations of 1820 may be performed by a BWP status manager 1335 as described with reference to FIG. 13.

At 1825, the method may include reassigning the second BWP to the main role responsive to the expiration of the first timer. The operations of 1825 may be performed in accordance with examples as disclosed herein. In some examples, aspects of the operations of 1825 may be performed by a BWP status manager 1335 as described with reference to FIG. 13.

At 1830, the method may include deactivating the first BWP responsive to the expiration of the first timer. The operations of 1830 may be performed in accordance with examples as disclosed herein. In some examples, aspects of the operations of 1830 may be performed by a BWP deactivation component 1340 as described with reference to FIG. 13.

Figure 19:
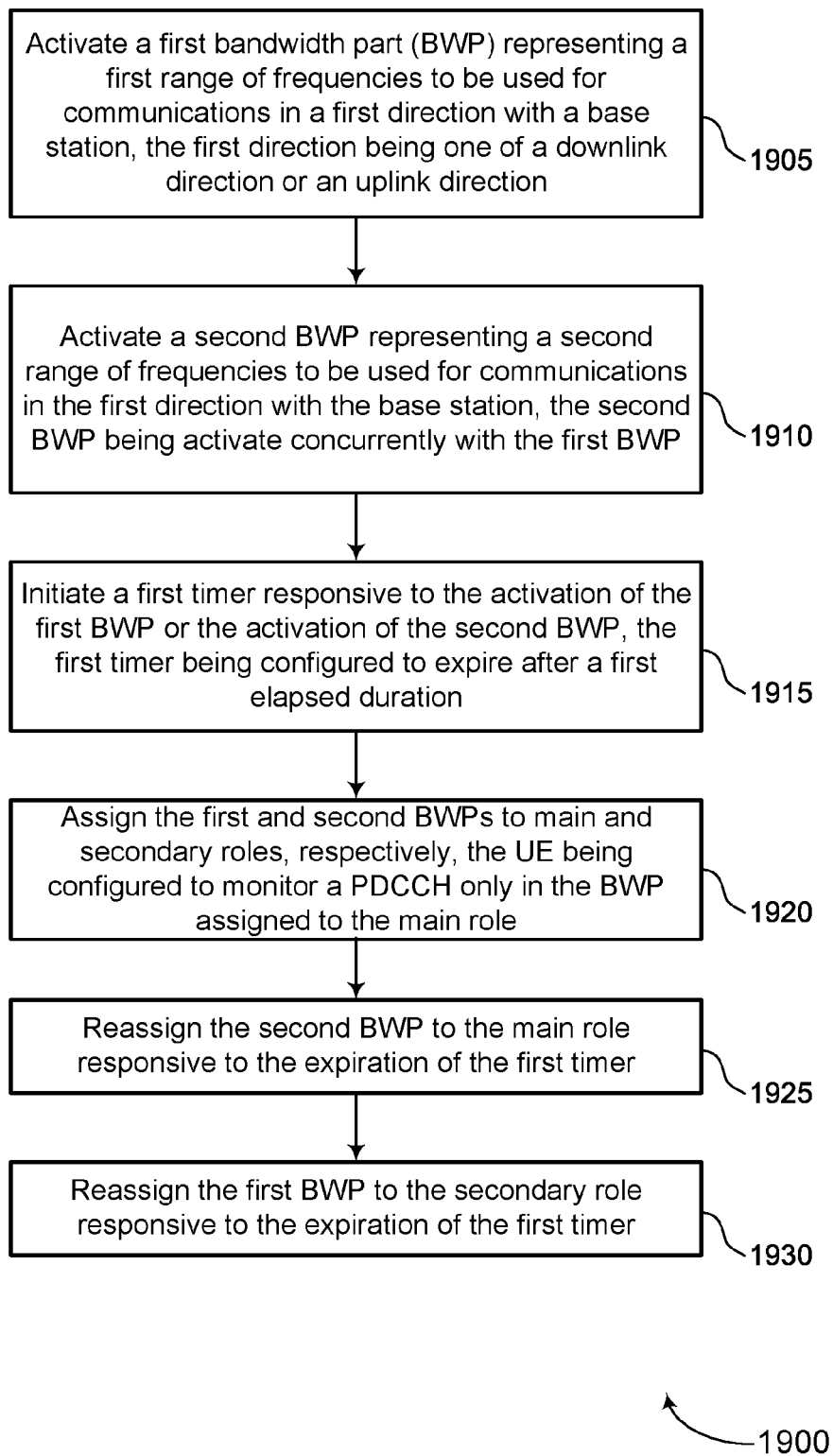

FIG. 19 shows a flowchart illustrating a method 1900 that supports timer-based switching for multiple active BWPs in accordance with aspects of the present disclosure. The operations of the method 1900 may be implemented by a UE or its components as described herein. For example, the operations of the method 1900 may be performed by a UE 115 as described with reference to FIGS. 1-14. In some examples, a UE may execute a set of instructions to control the functional elements of the UE to perform the described functions. Additionally, or alternatively, the UE may perform aspects of the described functions using special-purpose hardware.

At 1905, the method may include activating a first BWP representing a first range of frequencies to be used for communications in a first direction with a base station, the first direction being one of a downlink direction or an uplink direction. The operations of 1905 may be performed in accordance with examples as disclosed herein. In some examples, aspects of the operations of 1905 may be performed by a BWP activation component 1325 as described with reference to FIG. 13.

At 1910, the method may include activating a second BWP representing a second range of frequencies to be used for communications in the first direction with the base station, the second BWP being active concurrently with the first BWP. The operations of 1910 may be performed in accordance with examples as disclosed herein. In some examples, aspects of the operations of 1910 may be performed by a BWP activation component 1325 as described with reference to FIG. 13.

At 1915, the method may include initiating a first timer responsive to the activation of the first BWP or the activation of the second BWP, the first timer being configured to expire after a first elapsed duration. The operations of 1915 may be performed in accordance with examples as disclosed herein. In some examples, aspects of the operations of 1915 may be performed by a timer activation component 1330 as described with reference to FIG. 13.

At 1920, the method may include assigning the first and second BWPs to main and secondary roles, respectively, the UE being configured to monitor a PDCCH only in the BWP assigned to the main role. The operations of 1920 may be performed in accordance with examples as disclosed herein. In some examples, aspects of the operations of 1920 may be performed by a BWP status manager 1335 as described with reference to FIG. 13.

At 1925, the method may include reassigning the second BWP to the main role responsive to the expiration of the first timer. The operations of 1925 may be performed in accordance with examples as disclosed herein. In some examples, aspects of the operations of 1925 may be performed by a BWP status manager 1335 as described with reference to FIG. 13.

At 1930, the method may include reassigning the first BWP to the secondary role responsive to the expiration of the first timer. The operations of 1930 may be performed in accordance with examples as disclosed herein. In some examples, aspects of the operations of 1930 may be performed by a BWP status manager 1335 as described with reference to FIG. 13.

The following provides an overview of aspects of the present disclosure:

Aspect 1: A method of wireless communication by a UE, comprising: activating a first bandwidth part (BWP) representing a first range of frequencies to be used for communications in a first direction with a base station, the first direction being one of a downlink direction or an uplink direction; activating a second BWP representing a second range of frequencies to be used for communications in the first direction with the base station, the second BWP being active concurrently with the first BWP; initiating a first timer responsive to the activation of the first BWP or the activation of the second BWP, the first timer being configured to expire after a first elapsed duration; and changing a status of at least one of the first BWP or the second BWP based on the expiration of the first timer.

Aspect 2: The method of aspect 1, wherein the changing of the status of the at least one of the first BWP or the second BWP comprises: deactivating each of the first and second BWPs responsive to the expiration of the first timer; and activating a default BWP representing a third range of frequencies to be used for subsequent communications in the first direction with the base station.

Aspect 3: The method of aspect 2, wherein the third range of frequencies is narrower than each of the first and second ranges of frequencies.

Aspect 4: The method of any of aspects 1 through 3, further comprising: initiating a second timer responsive to the activation of the first and second BWPs, the second timer being configured to expire after a second elapsed duration.

Aspect 5: The method of aspect 4, wherein the changing of the status of the at least one of the first BWP or the second BWP comprises: deactivating the first BWP responsive to the expiration of the first timer; and deactivating the second BWP responsive to the expiration of the second timer.

Aspect 6: The method of aspect 5, wherein the first timer expires prior to the expiration of the second timer, the second BWP remaining active after the expiration of the first timer.

Aspect 7: The method of any of aspects 5 through 6, wherein the second timer expires prior to the expiration of the first timer, the first BWP remaining active after the expiration of the second timer.

Aspect 8: The method of any of aspects 5 through 7, wherein the changing of the status of the at least one of the first BWP or the second BWP further comprises: activating a default BWP responsive to the deactivation of at least one of the first BWP or the second BWP, the default BWP representing a third range of frequencies to be used for subsequent communications in the first direction with the base station.

Aspect 9: The method of aspect 8, wherein the third range of frequencies is narrower than each of the first and second ranges of frequencies.

Aspect 10: The method of any of aspects 8 through 9, wherein the first timer expires prior to the expiration of the second timer, the second BWP and the default BWP being concurrently active after the expiration of the first timer.

Aspect 11: The method of any of aspects 8 through 10, wherein the second timer expires prior to the expiration of the first timer, the first BWP and the default BWP being concurrently active after the expiration of the second timer.

Aspect 12: The method of any of aspects 8 through 11, wherein the default BWP is the only active BWP after the expirations of the first and second timers.

Aspect 13: The method of any of aspects 1 through 12, wherein the UE is configured to monitor a PDCCH in each active BWP.

Aspect 14: The method of any of aspects 1 through 13, further comprising: assigning the first and second BWPs to main and secondary roles, respectively, the UE being configured to monitor a PDCCH only in the BWP assigned to the main role.

Aspect 15: The method of aspect 14, wherein the changing of the status of the at least one of the first BWP or the second BWP comprises: reassigning the second BWP to the main role responsive to the expiration of the first timer.

Aspect 16: The method of aspect 15, wherein the changing of the status of the at least one of the first BWP or the second BWP further comprises: deactivating the first BWP responsive to the expiration of the first timer.

Aspect 17: The method of any of aspects 15 through 16, wherein the changing of the status of the at least one of the first BWP or the second BWP further comprises: reassigning the first BWP to the secondary role responsive to the expiration of the first timer.

Aspect 18: The method of any of aspects 14 through 17, wherein the second range of frequencies is narrower than the first range of frequencies.

Aspect 19: The method of any of aspects 1 through 18, wherein the first range of frequencies overlaps the second range of frequencies.

Aspect 20: The method of any of aspects 1 through 19, wherein the first range of frequencies does not overlap the second range of frequencies.

Aspect 21: An apparatus comprising a processor; memory coupled with the processor; and instructions stored in the memory and executable by the processor to cause the apparatus to perform a method of any of aspects 1 through 20.

Aspect 22: An apparatus comprising at least one means for performing a method of any of aspects 1 through 20.

Aspect 23: A non-transitory computer-readable medium storing code the code comprising instructions executable by a processor to perform a method of any of aspects 1 through 20.

It should be noted that the methods described herein describe possible implementations, and that the operations and the steps may be rearranged or otherwise modified and that other implementations are possible. Further, aspects from two or more of the methods may be combined.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method of wireless communication by a user equipment (UE), comprising:
   activating, prior to a start of a first slot that is configured with a first operation type that is one of a half-duplex operation type or a full-duplex operation type, a first bandwidth part (BWP) representing a first range of frequencies to be used for communications in a first direction with a network device within the first slot, the first direction being one of a downlink direction or an uplink direction;
   activating, prior to the start of the first slot, a second BWP representing a second range of frequencies to be used for communications in the first direction with the network device within a second slot that is configured with a second operation type different than the first operation type, the second BWP being active concurrently with the first BWP within the first slot;
   initiating a first timer responsive to the activation of the first BWP or the activation of the second BWP, the first timer being configured to expire after a first elapsed duration; and
   changing a status of at least one of the first BWP or the second BWP based on the expiration of the first timer.

2. The method of claim 1, wherein the changing of the status of the at least one of the first BWP or the second BWP comprises:
   deactivating each of the first BWP and the second BWP responsive to the expiration of the first timer; and
   activating a default BWP representing a third range of frequencies to be used for subsequent communications in the first direction with the network device.

3. The method of claim 2, wherein the third range of frequencies is narrower than each of the first range of frequencies and the second range of frequencies.

4. The method of claim 1, further comprising initiating a second timer responsive to the activation of the first BWP and the second BWP, the second timer being configured to expire after a second elapsed duration.

5. The method of claim 4, wherein the changing of the status of the at least one of the first BWP or the second BWP comprises:
   deactivating the first BWP responsive to the expiration of the first timer; and
   deactivating the second BWP responsive to the expiration of the second timer.

6. The method of claim 5, wherein the first timer expires prior to the expiration of the second timer, the second BWP remaining active after the expiration of the first timer.

7. The method of claim 5, wherein the changing of the status of the at least one of the first BWP or the second BWP further comprises activating a default BWP, the default BWP representing a third range of frequencies to be used for subsequent communications in the first direction with the network device.

8. The method of claim 7, wherein the third range of frequencies is narrower than each of the first range of frequencies and the second range of frequencies.

9. The method of claim 7, wherein the first timer expires prior to the expiration of the second timer, the second BWP and the default BWP being concurrently active after the expiration of the first timer.

10. The method of claim 7, wherein the default BWP is the only active BWP after the expirations of the first timer and the expiration of the second timer.

11. The method of claim 1, wherein the UE is configured to monitor a physical downlink control channel (PDCCH) in each active BWP.

12. The method of claim 1, further comprising assigning the first BWP and the second BWP to a main role and a secondary role, respectively, the UE being configured to monitor a PDCCH only in the BWP assigned to the main role.

13. The method of claim 12, wherein the changing of the status of the at least one of the first BWP or the second BWP comprises reassigning the second BWP to the main role responsive to the expiration of the first timer.

14. The method of claim 13, wherein the changing of the status of the at least one of the first BWP or the second BWP further comprises deactivating the first BWP responsive to the expiration of the first timer.

15. The method of claim 13, wherein the changing of the status of the at least one of the first BWP or the second BWP further comprises reassigning the first BWP to the secondary role responsive to the expiration of the first timer.

16. The method of claim 12, wherein the second range of frequencies is narrower than the first range of frequencies.

17. The method of claim 1, wherein the first range of frequencies overlaps the second range of frequencies.

18. The method of claim 1, wherein the first range of frequencies does not overlap the second range of frequencies.

19. The method of claim 1, wherein the second slot is adjacent to the first slot, and wherein the first BWP and the second BWP are active concurrently both within the first slot and within a transition from the first operation type to the second operation type.

20. An apparatus, comprising:
at least one processor; and
at least one memory coupled with the at least one processor,
the at least one memory storing instructions executable by the at least one processor to cause the apparatus to:
activate, prior to a start of a first slot that is configured with a first operation type that is one of a half-duplex operation type or a full-duplex operation type, a first bandwidth part (BWP) representing a first range of frequencies to be used for communications in a first direction with a network device within the first slot, the first direction being one of a downlink direction or an uplink direction;
activate, prior to the start of the first slot, a second BWP representing a second range of frequencies to be used for communications in the first direction with the network device within a second slot that is configured with a second operation type different than the first operation type, the second BWP being active concurrently with the first BWP within the first slot;
initiate a first timer responsive to the activation of the first BWP or the activation of the second BWP, the first timer being configured to expire after a first elapsed duration; and
change a status of at least one of the first BWP or the second BWP based on the expiration of the first timer.

21. The apparatus of claim 20, wherein the instructions to changing of the status of the at least one of the first BWP or the second BWP are executable by the at least one processor to cause the apparatus to:
deactivate each of the first BWP and the second BWP responsive to the expiration of the first timer; and
activate a default BWP representing a third range of frequencies to be used for subsequent communications in the first direction with the network device.

22. The apparatus of claim 21, wherein the third range of frequencies is narrower than each of the first range of frequencies and the second range of frequencies.

23. The apparatus of claim 20, wherein the instructions are further executable by the at least one processor to cause the apparatus to initiate a second timer responsive to the activation of the first BWP and the second BWP, the second timer being configured to expire after a second elapsed duration.

24. The apparatus of claim 23, wherein the instructions are further executable by the at least one processor to cause the apparatus to:
deactivate the first BWP responsive to the expiration of the first timer; and
deactivate the second BWP responsive to the expiration of the second timer.

25. The apparatus of claim 24, wherein the first timer expires prior to the expiration of the second timer, the second BWP remaining active after the expiration of the first timer.

26. The apparatus of claim 24, wherein the changing of the status of the at least one of the first BWP or the second BWP further comprises activating a default BWP, the default BWP representing a third range of frequencies to be used for subsequent communications in the first direction with the network device.

27. The apparatus of claim 26, wherein the third range of frequencies is narrower than each of the first range of frequencies and the second range of frequencies.

28. The apparatus of claim 26, wherein the first timer expires prior to the expiration of the second timer, the second BWP and the default BWP being concurrently active after the expiration of the first timer.

29. The apparatus of claim 26, wherein the default BWP is the only active BWP after the expirations of the first timer and the expiration of the second timer.

30. An apparatus, comprising:
means for activating, prior to a start of a first slot that is configured with a first operation type that is one of a half-duplex operation type or a full-duplex operation type, a first bandwidth part (BWP) representing a first range of frequencies to be used for communications in a first direction with a network device within the first slot, the first direction being one of a downlink direction or an uplink direction;

means for activating, prior to the start of the first slot, a second BWP representing a second range of frequencies to be used for communications in the first direction with the network device within a second slot that is configured with a second operation type different than the first operation type, the second BWP being active concurrently with the first BWP within the first slot;

means for initiating a first timer responsive to the activation of the first BWP or the activation of the second BWP, the first timer being configured to expire after a first elapsed duration; and means for changing a status of at least one of the first BWP or the second BWP based on the expiration of the first timer.

31. A non-transitory computer-readable medium storing code, the code comprising instructions executable by at least one processor to:

activate, prior to a start of a first slot that is configured with a first operation type that is one of a half-duplex operation type or a full-duplex operation type, a first bandwidth part (BWP) representing a first range of frequencies to be used for communications in a first direction with a network device within the first slot, the first direction being one of a downlink direction or an uplink direction;

activate, prior to the start of the first slot, a second BWP representing a second range of frequencies to be used for communications in the first direction with the network device within a second slot that is configured with a second operation type different than the first operation type, the second BWP being active concurrently with the first BWP within the first slot;

initiate a first timer responsive to the activation of the first BWP or the activation of the second BWP, the first timer being configured to expire after a first elapsed duration; and change a status of at least one of the first BWP or the second BWP based on the expiration of the first timer.

* * * * *